(12) United States Patent
Ahern et al.

(10) Patent No.: US 10,882,601 B2
(45) Date of Patent: Jan. 5, 2021

(54) AIRCRAFT WINGS HAVING IMPROVED DEFLECTION CONTROL RIBS

(71) Applicant: The Boeing Company, Chicago, IL (US)

(72) Inventors: Erin Ahern, Seattle, WA (US); Tom Mark Balut, Renton, WA (US); Gary Bond, Kent, WA (US); Bryan Jacob Gruner, Bellevue, WA (US); Eric Milligan, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 630 days.

(21) Appl. No.: 15/783,385

(22) Filed: Oct. 13, 2017

(65) Prior Publication Data
US 2019/0112027 A1  Apr. 18, 2019

(51) Int. Cl.
*B64C 9/16* (2006.01)
*B64C 3/18* (2006.01)
*B64C 9/02* (2006.01)

(52) U.S. Cl.
CPC .............. *B64C 3/187* (2013.01); *B64C 3/185* (2013.01); *B64C 9/02* (2013.01); *B64C 9/16* (2013.01)

(58) Field of Classification Search
CPC ........... B64C 3/187; B64C 3/185; B64C 9/02; B64C 9/16; B64C 9/18; F16C 2326/43
See application file for complete search history.

(56) References Cited

U.S. PATENT DOCUMENTS

| | | | | |
|---|---|---|---|---|
| 2,579,534 A | * | 12/1951 | Anderson | B64C 9/18 244/216 |
| 2,620,147 A | * | 12/1952 | Cook, Jr. | B64C 9/18 244/216 |
| 2,836,380 A | * | 5/1958 | Pearson | B64C 9/16 244/216 |
| 4,181,275 A | * | 1/1980 | Moelter | B64C 9/16 244/213 |
| 4,995,575 A | * | 2/1991 | Stephenson | B64C 9/16 244/216 |
| 8,876,065 B2 | * | 11/2014 | Grieco | B64C 9/02 244/213 |
| 9,452,819 B2 | * | 9/2016 | Zeon | B64C 1/38 |
| 9,856,014 B2 | * | 1/2018 | Osborn | B64C 9/04 |
| 2009/0146016 A1 | * | 6/2009 | Kordel | B64C 9/16 244/215 |

(Continued)

*Primary Examiner* — Medhat Badawi
*Assistant Examiner* — Vicente Rodriguez
(74) *Attorney, Agent, or Firm* — Hanley, Flight & Zimmerman, LLC

(57) ABSTRACT

Aircraft wings having improved deflection control ribs are described. An example aircraft wing includes a rear spar, an outboard flap, a rear spar fitting, and a deflection control rib. The outboard flap is movable relative to the rear spar between a stowed position and a deployed position. The outboard flap includes a closure rib and a roller coupled to the closure rib. The rear spar fitting is coupled to the rear spar. The deflection control rib includes a primary arm and a catch. The primary arm is coupled to and extends rearward from the rear spar fitting proximate a lower surface of the aircraft wing. The catch is coupled to and extends rearward from the primary arm. The catch includes an opening to receive the roller of the outboard flap when the outboard flap is in the stowed position.

21 Claims, 18 Drawing Sheets

(56) References Cited

U.S. PATENT DOCUMENTS

2009/0212977 A1\* 8/2009 Pohl .................. B64D 45/0005
340/963
2011/0042525 A1\* 2/2011 Parker .................. F16C 23/086
244/213

\* cited by examiner

AIRCRAFT WINGS HAVING IMPROVED DEFLECTION CONTROL RIBS

FIELD OF THE DISCLOSURE

This disclosure relates generally to aircraft wings and, more specifically, to aircraft wings having improved deflection control ribs.

BACKGROUND

Aircraft wings (e.g., the wings of a commercial aircraft) commonly include flaps (e.g., outboard flaps and/or inboard flaps) that are movable relative to the aircraft wings between stowed and deployed positions. Deploying the flaps from the aircraft wings during flight typically increases a lift characteristic associated with the aircraft wings, while stowing the flaps during flight typically reduces the lift characteristic. Aircraft wings may include deflection control ribs to increase the stiffness of the flaps and/or to reduce the potential for deflection of the flaps relative to the aircraft wings when the flaps are stowed.

SUMMARY

Aircraft wings having improved deflection control ribs are disclosed herein. In some examples, an aircraft wing is disclosed. In some disclosed examples, the aircraft wing comprises a rear spar, an outboard flap, a rear spar fitting, and a deflection control rib. In some disclosed examples, the outboard flap is movable relative to the rear spar between a stowed position and a deployed position. In some disclosed examples, the outboard flap includes a closure rib and a roller coupled to the closure rib. In some disclosed examples, the rear spar fitting is coupled to the rear spar. In some disclosed examples, the deflection control rib includes a primary arm and a catch. In some disclosed examples, the primary arm is coupled to and extends rearward from the rear spar fitting proximate a lower surface of the aircraft wing. In some disclosed examples, the catch is coupled to and extends rearward from the primary arm. In some disclosed examples, the catch includes an opening to receive the roller of the outboard flap when the outboard flap is in the stowed position.

In some examples, a deflection control rib is disclosed. In some disclosed examples, the deflection control rib comprises a primary arm and a catch. In some disclosed examples, the primary arm is to be coupled to and extend rearward from a rear spar fitting of an aircraft wing proximate a lower surface of the aircraft wing. In some disclosed examples, the rear spar fitting is to be coupled to a rear spar of the aircraft wing. In some disclosed examples, the catch is coupled to and extends rearward from the primary arm. In some disclosed examples, the catch includes an opening to receive a roller of an outboard flap of the aircraft wing when the outboard flap is in a stowed position. In some disclosed examples, the outboard flap is to be movable relative to the rear spar between the stowed position and a deployed position. In some disclosed examples, the outboard flap is to include a closure rib and the roller. In some disclose examples, the roller is to be coupled to the closure rib.

In some examples, an outboard flap is disclosed. In some disclosed examples, the outboard flap comprises a closure rib and a roller coupled to the closure rib. In some disclosed examples, the outboard flap is to be movable relative to a rear spar of an aircraft wing between a stowed position and a deployed position. In some disclosed examples, the roller is to be received by an opening of a catch of a deflection control rib of the aircraft wing when the outboard flap is in the stowed position. In some disclosed examples, the catch is to be coupled to and extend rearward from a primary arm of the deflection control rib. In some disclosed examples, the primary arm is to be coupled to and extend rearward from a rear spar fitting of the aircraft wing proximate a lower surface of the aircraft wing. In some disclosed examples, the rear spar fitting is to be coupled to the rear spar.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Aircraft wings (e.g., the wings of a commercial aircraft) commonly include flaps (e.g., outboard flaps and/or inboard flaps) that are movable relative to the aircraft wings between stowed and deployed positions. Such aircraft wings may also include deflection control ribs to increase the stiffness of the flaps and/or to reduce the potential for deflection of the flaps relative to the aircraft wings when the flaps are stowed. The aircraft wings disclosed herein advantageously include deflection control ribs that are improved relative to known deflection control ribs of conventional aircraft wings. For example, an improved deflection control rib disclosed herein incorporates a catch having a shape (e.g., a maximum width and/or maximum lateral thickness) that advantageously reduces (e.g., eliminates) any need for cutouts in the respective leading edges of the outboard and inboard flaps of the disclosed aircraft wing. The absence of such cutouts from the respective leading edges of the flaps advantageously increases the aerodynamic performance (e.g., decreases drag) associated with the aircraft wing when the outboard flap and/or the inboard flap is/are deployed at low flight speeds and positioned at high detents (e.g., flaps 30, flaps 40, etc.). As further described herein, the size, shape, location, and/or arrangement of the improved deflection control rib provides numerous other benefits with respect to the aerodynamic performance and/or the internal design of the aircraft wing.

Figure 1:
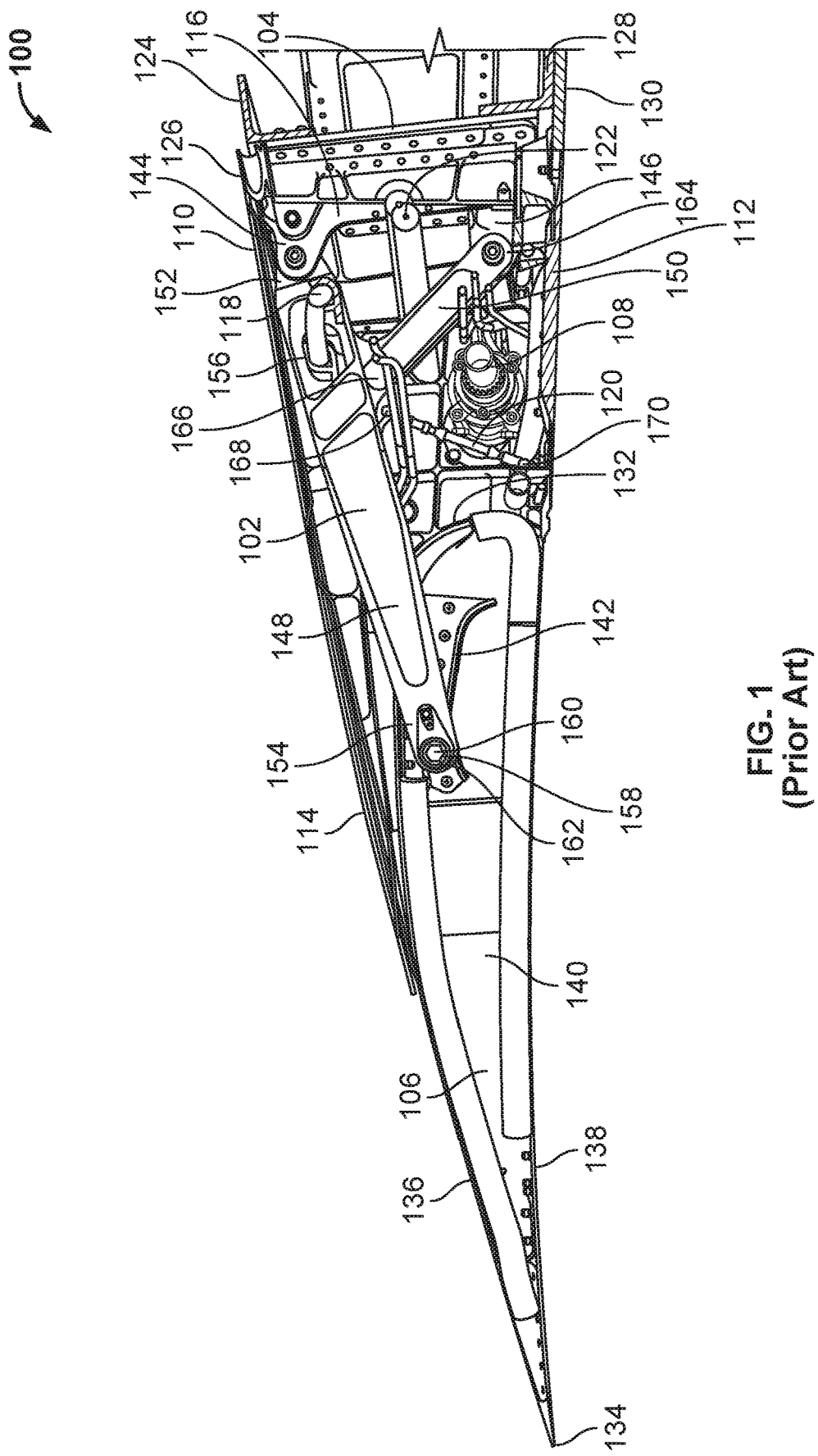
FIG. 1 is a cross-sectional view of a known aircraft wing having a known deflection control rib.
Figure 2:
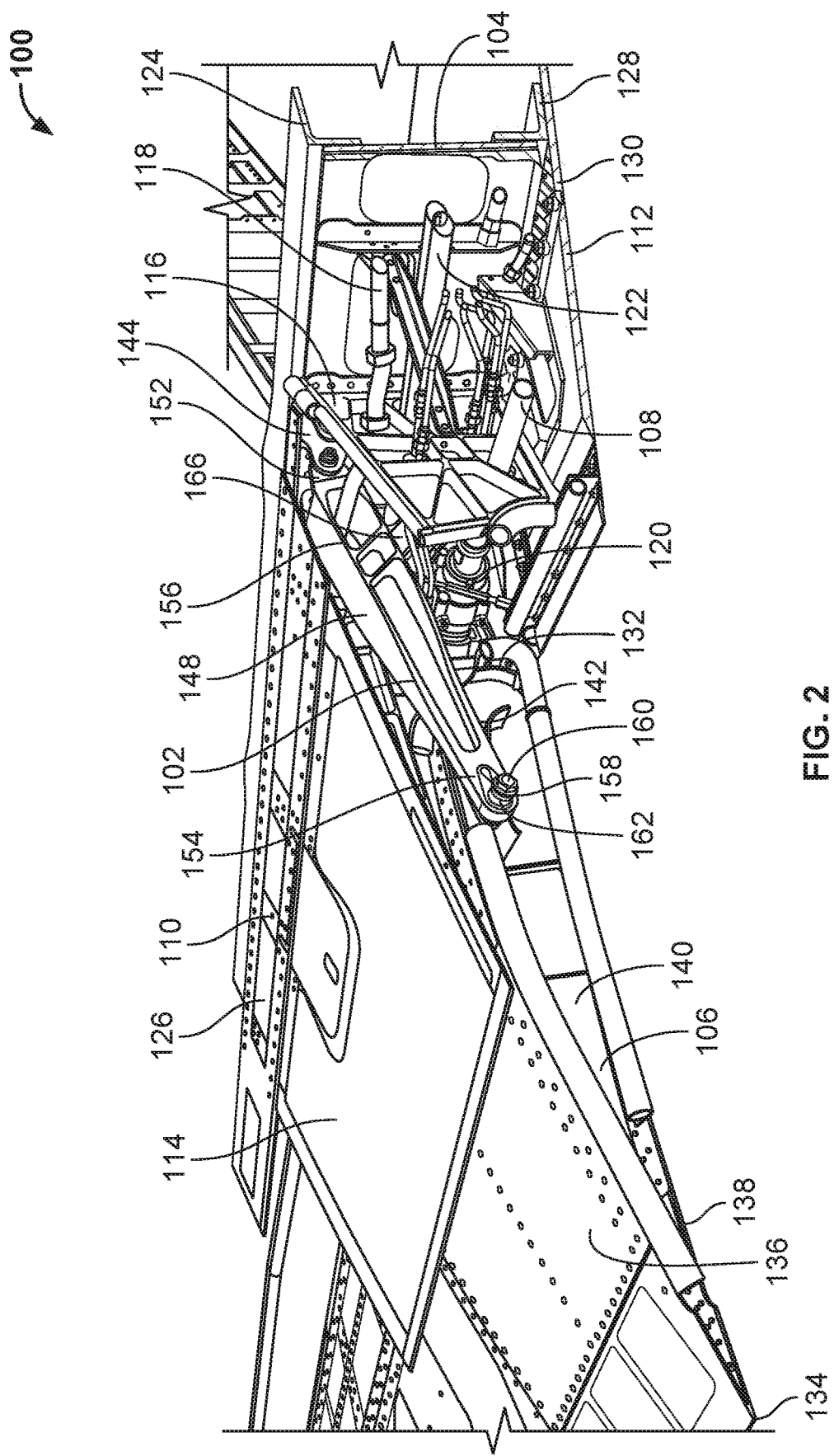
FIG. 2 is a first partial cutaway perspective view of the known aircraft wing of FIG. 1 including the known deflection control rib of FIG. 1.
Figure 3:
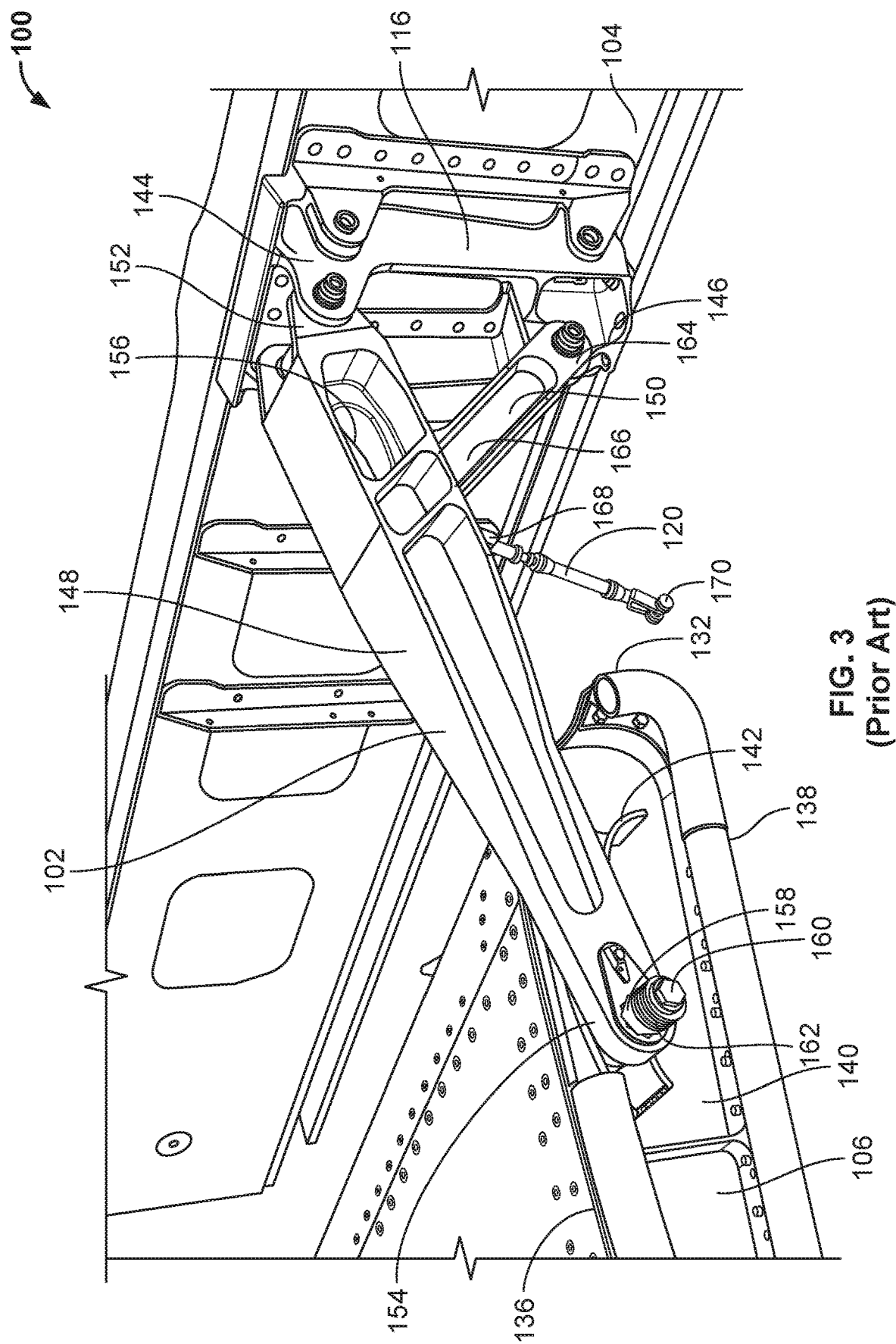
FIG. 3 is a second partial cutaway perspective view of the known aircraft wing of FIGS. 1 and 2 including the known deflection control rib of FIGS. 1 and 2.
Figure 4:
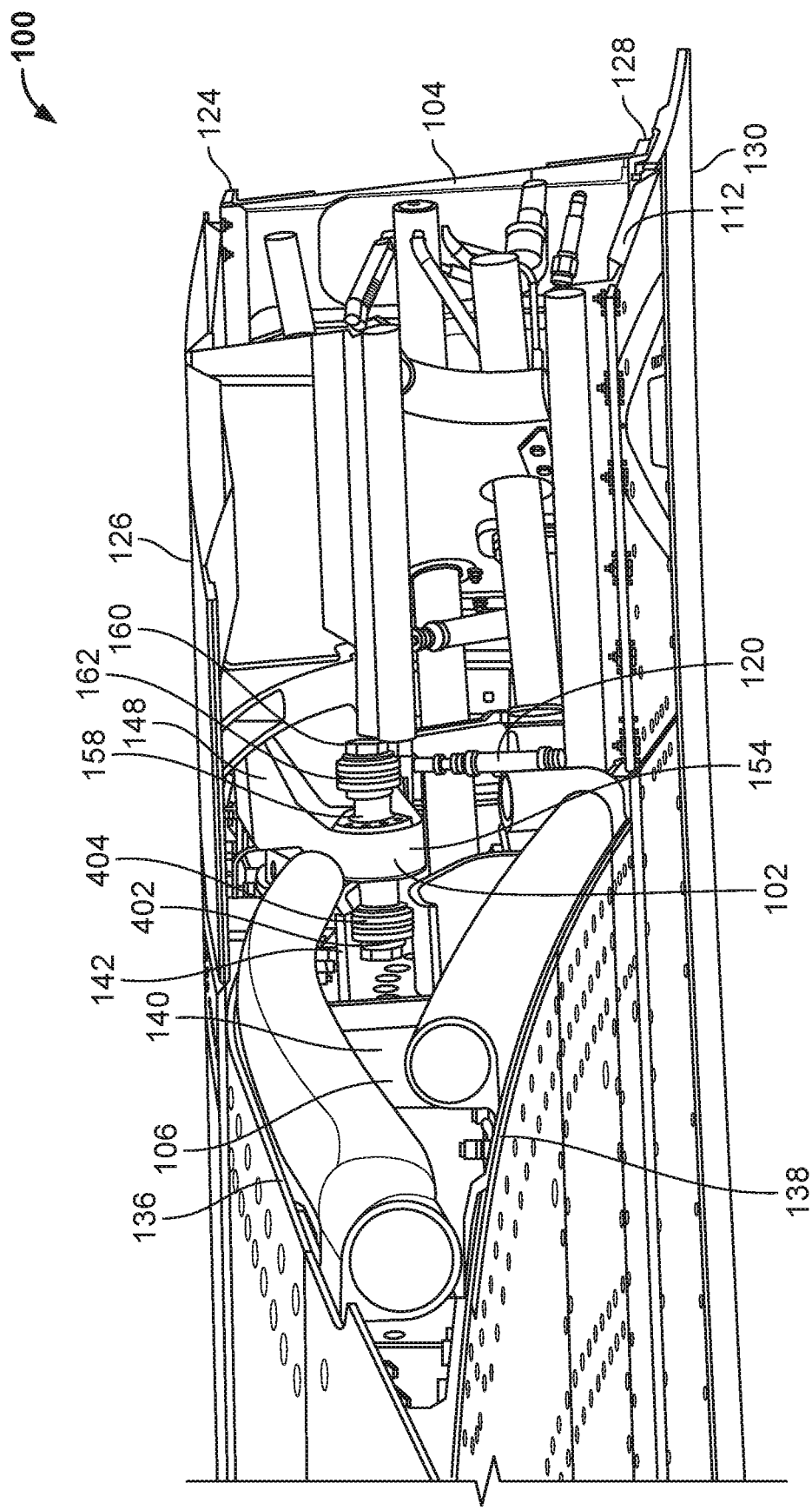
FIG. 4 is a third partial cutaway perspective view of the known aircraft wing of FIGS. 1-3 including the known deflection control rib of FIGS. 1-3.
Figure 5:
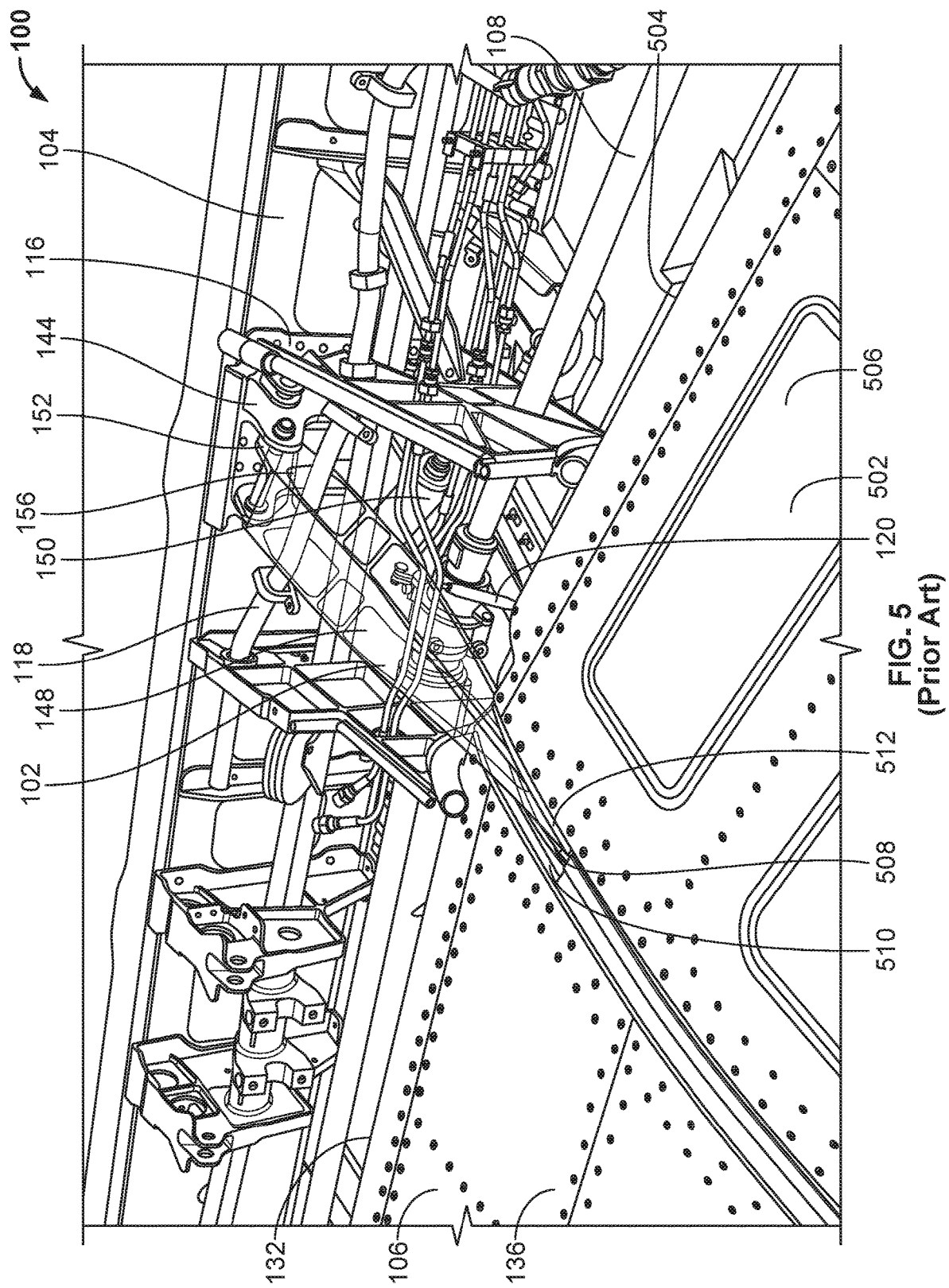
FIG. 5 is a fourth partial cutaway perspective view of the known aircraft wing of FIGS. 1-4 including the known deflection control rib of FIGS. 1-4.
Figure 6:
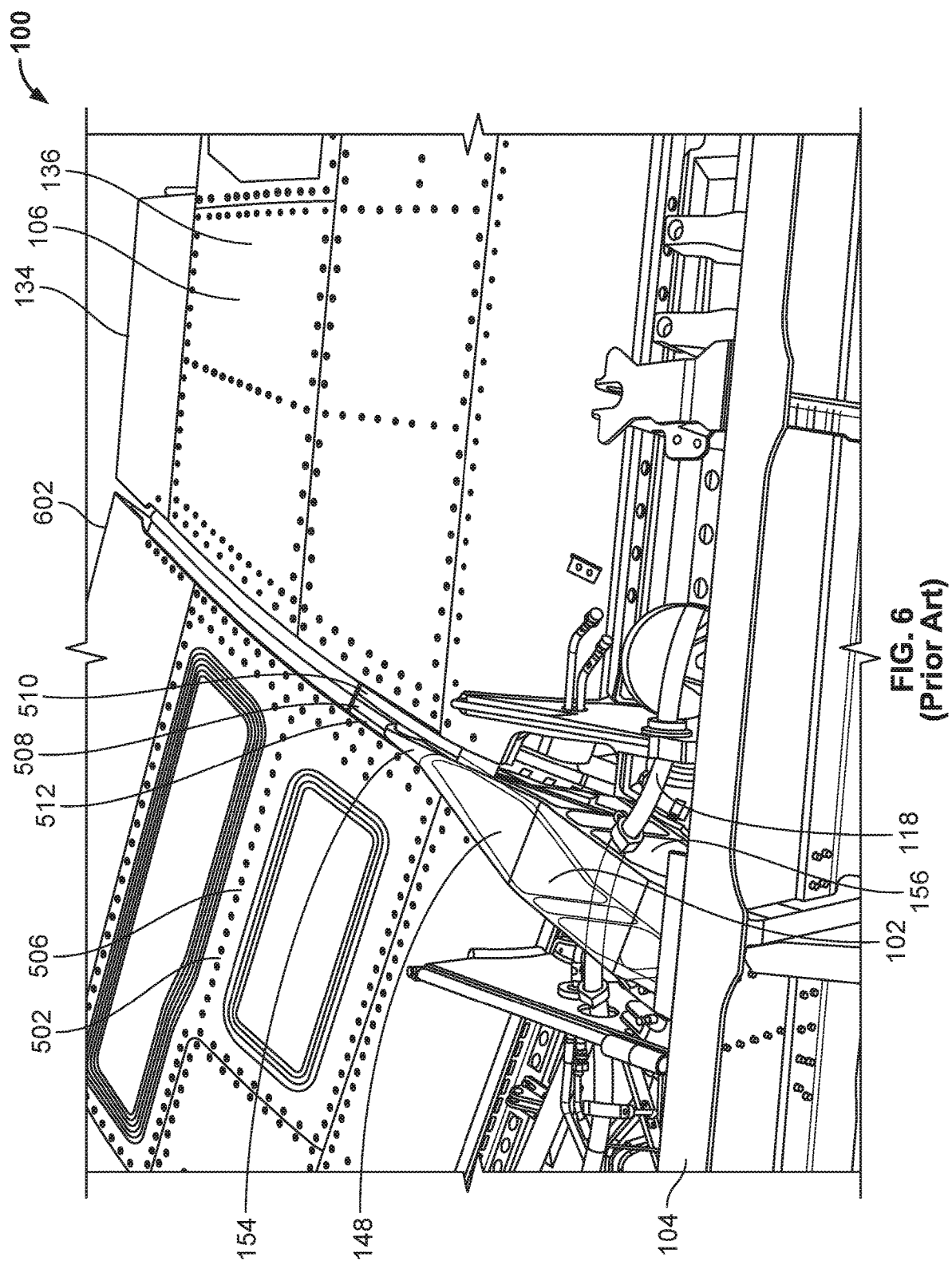
FIG. 6 is a fifth partial cutaway perspective view of the known aircraft wing of FIGS. 1-5 including the known deflection control rib of FIGS. 1-5.
Figure 7:
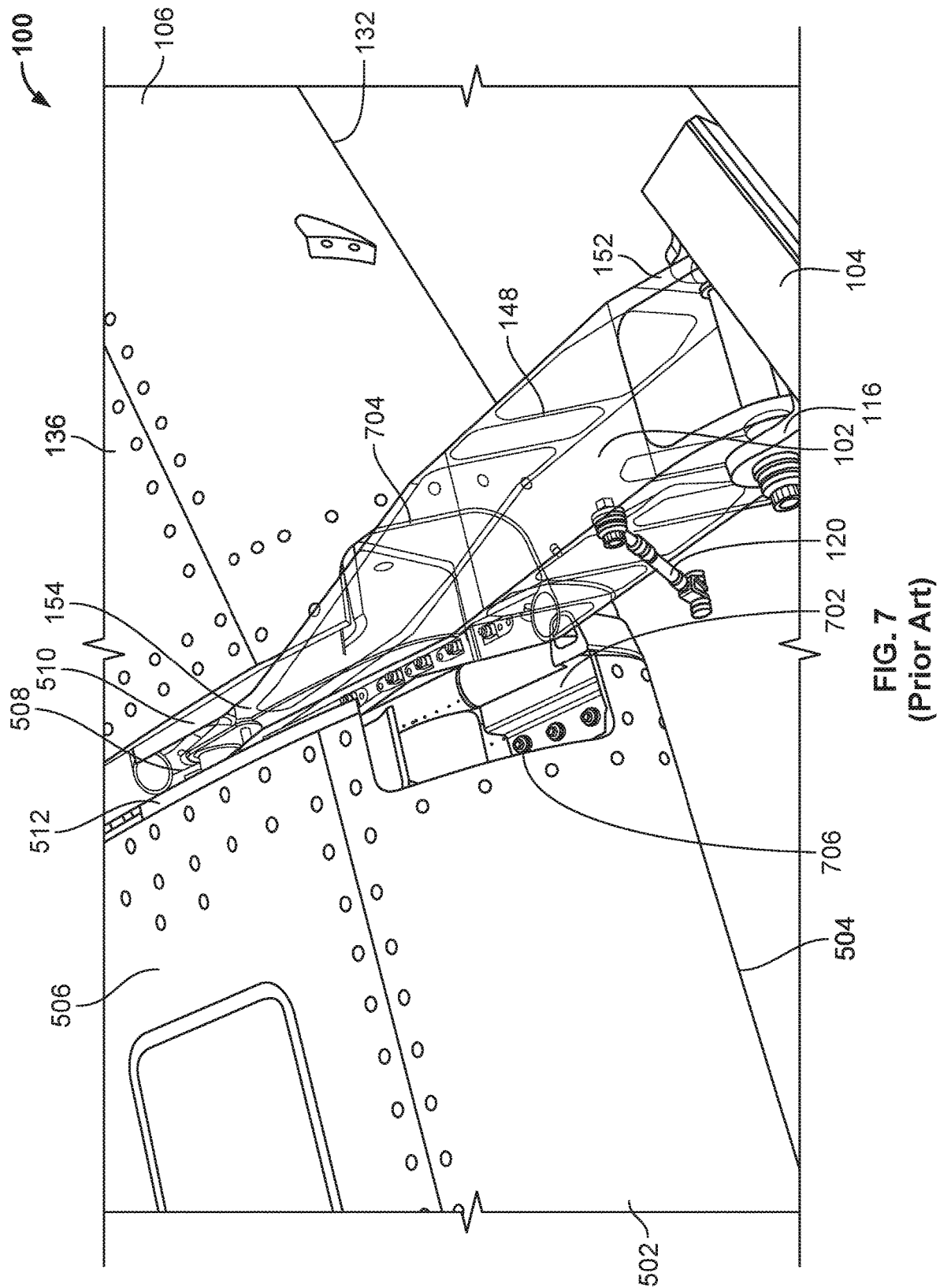
FIG. 7 is a sixth partial cutaway perspective view of the known aircraft wing of FIGS. 1-6 including the known deflection control rib of FIGS. 1-6.
Figure 8:
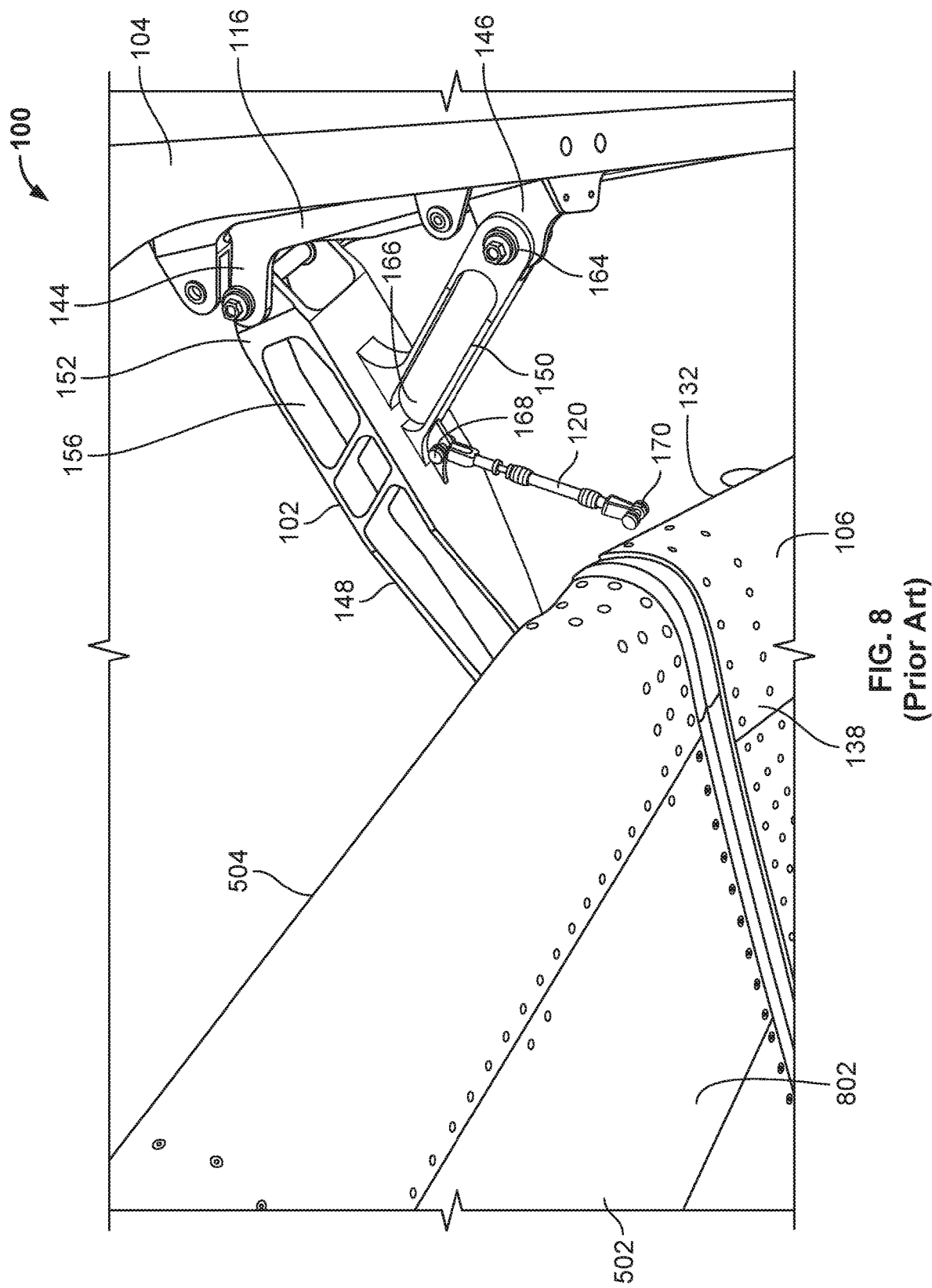
FIG. 8 is a seventh partial cutaway perspective view of the known aircraft wing of FIGS. 1-7 including the known deflection control rib of FIGS. 1-7.
Figure 9:
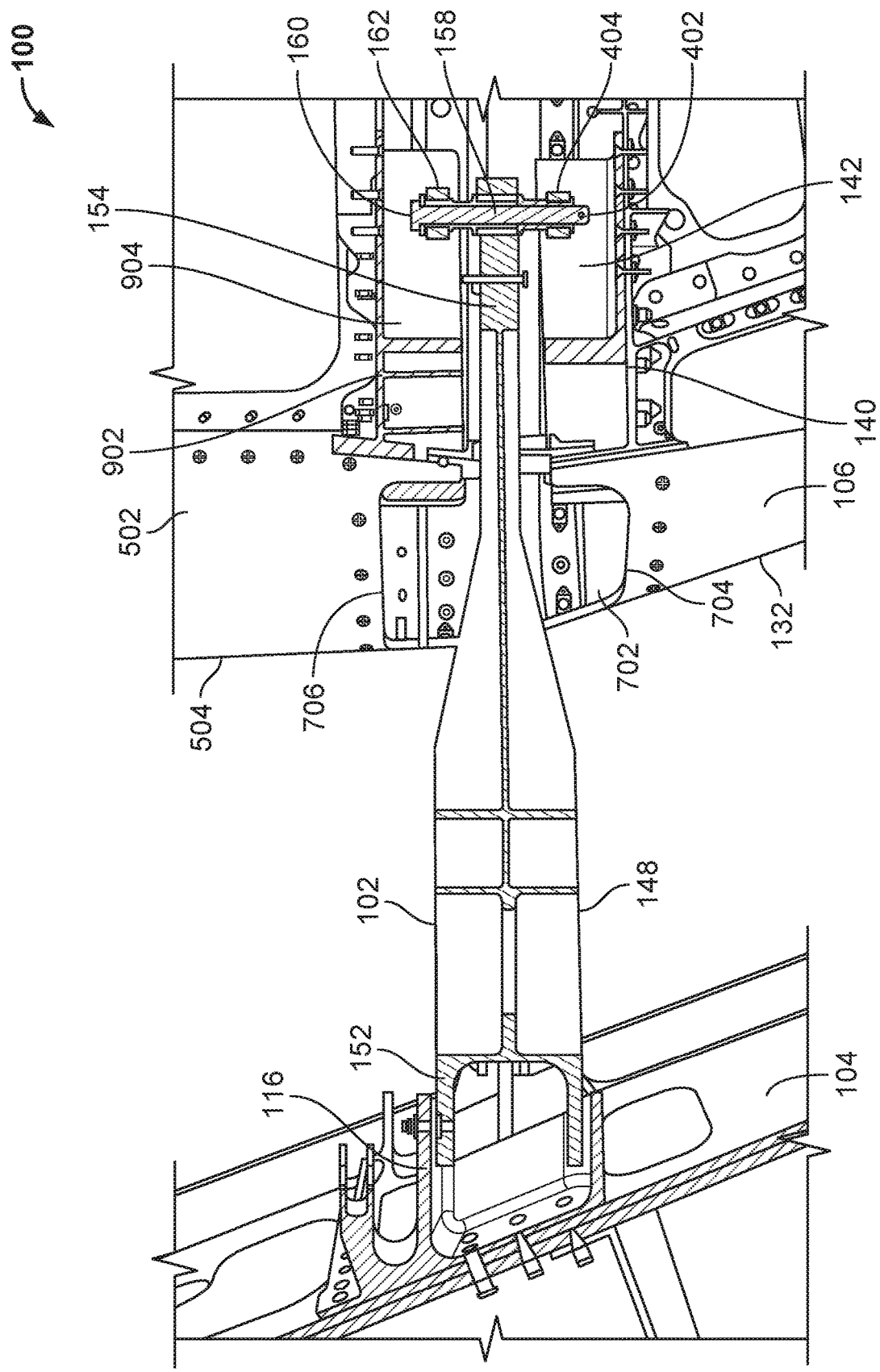
FIG. 9 is a partial cutaway plan view of the known aircraft wing of FIGS. 1-8 including the known deflection control rib of FIGS. 1-8.

Before describing the details of the disclosed aircraft wings having improved deflection control ribs, a description of a known aircraft wing having a known deflection control rib is provided in connection with FIGS. 1-9. FIG. 1 is a cross-sectional view of a known aircraft wing 100 having a known deflection control rib 102. FIG. 2 is a first partial cutaway perspective view of the known aircraft wing 100 of FIG. 1 including the known deflection control rib 102 of FIG. 1. FIG. 3 is a second partial cutaway perspective view of the known aircraft wing 100 of FIGS. 1 and 2 including the known deflection control rib 102 of FIGS. 1 and 2. FIG. 4 is a third partial cutaway perspective view of the known aircraft wing 100 of FIGS. 1-3 including the known deflection control rib 102 of FIGS. 1-3. FIG. 5 is a fourth partial cutaway perspective view of the known aircraft wing 100 of FIGS. 1-4 including the known deflection control rib 102 of FIGS. 1-4. FIG. 6 is a fifth partial cutaway perspective view of the known aircraft wing 100 of FIGS. 1-5 including the known deflection control rib 102 of FIGS. 1-5. FIG. 7 is a sixth partial cutaway perspective view of the known aircraft wing 100 of FIGS. 1-6 including the known deflection control rib 102 of FIGS. 1-6. FIG. 8 is a seventh partial cutaway perspective view of the known aircraft wing 100 of FIGS. 1-7 including the known deflection control rib 102 of FIGS. 1-7. FIG. 9 is a partial cutaway plan view of the known aircraft wing 100 of FIGS. 1-8 including the known deflection control rib 102 of FIGS. 1-8.

The aircraft wing 100 of FIGS. 1-9 includes the deflection control rib 102, a rear spar 104, an outboard flap 106, a flap drive 108, an upper fixed trailing edge panel 110, a lower fixed trailing edge panel 112, a spoiler 114, a rear spar fitting 116, an electrical wiring bundle 118, a tie rod 120, and an aileron cable bundle 122. The rear spar 104 of FIGS. 1-9 extends in a spanwise direction along a portion of the aircraft wing 100. The rear spar 104 includes an upper chord 124 located proximate an upper surface 126 of the aircraft wing 100, and a lower chord 128 located opposite the upper chord 124 proximate a lower surface 130 of the aircraft wing 100.

The outboard flap 106 of FIGS. 1-9 extends along a portion of the rear spar 104 of FIGS. 1-9 and is movably coupled thereto via a deployment mechanism (not shown) driven and/or controlled via the flap drive 108 of FIGS. 1-9. Actuation of the flap drive 108 causes the outboard flap 106 to move relative to the rear spar 104 between the stowed position shown in FIGS. 1-9 and a deployed position in which the outboard flap 106 is spaced further away from the rear spar 104 relative to the spacing associated with the stowed position shown in FIGS. 1-9. The outboard flap 106 of FIGS. 1-9 includes a leading edge 132, a trailing edge 134 located aft and/or rearward of the leading edge 132, an upper surface 136 extending between the leading edge 132 and the trailing edge 134, a lower surface 138 located opposite the upper surface 136 and also extending between the leading edge 132 and the trailing edge 134, a closure rib 140 extending between the leading edge 132, the trailing edge 134, the upper surface 136 and the lower surface 138, and a track 142 coupled to and/or mounted on the closure rib 140.

As shown in FIGS. 5-9, the aircraft wing 100 of FIGS. 1-9 further includes an inboard flap 502 located laterally adjacent the outboard flap 106 of FIGS. 1-9 along the spanwise direction of the rear spar 104 and/or the aircraft wing 100 of FIGS. 1-9. Like the outboard flap 106, the inboard flap 502 of FIGS. 5-9 extends along a portion of the rear spar 104 of FIGS. 1-9 and is movably coupled thereto via a deployment mechanism (not shown) driven and/or controlled via the flap drive 108 of FIGS. 1-9. Actuation of the flap drive 108 causes the inboard flap 502 to move relative to the rear spar 104 between the stowed position shown in FIGS. 5-9 and a deployed position in which the inboard flap 502 is spaced further away from the rear spar 104 relative to the spacing associated with the stowed position shown in FIGS. 5-9. The inboard flap 502 of FIGS. 5-9 includes a leading edge 504, a trailing edge 602 located aft and/or rearward of the leading edge 504, an upper surface 506 extending between the leading edge 504 and the trailing edge 602, a lower surface 802 located opposite the upper surface 506 and also extending between the leading edge 504 and the trailing edge 602, a closure rib 902 extending between the leading edge 504, the trailing edge 602, the upper surface 506 and the lower surface 802, and a track 904 coupled to and/or mounted on the closure rib 902. The closure rib 902 and track 904 of the inboard flap 502 face the closure rib 140 and the track 142 of the outboard flap 106.

The upper fixed trailing edge panel 110 of FIGS. 1-9 is coupled and/or mounted to the upper chord 124 of the rear spar 104 of FIGS. 1-9 and extends in an aft and/or rearward direction therefrom. The lower fixed trailing edge panel 112 of FIGS. 1-9 is coupled and/or mounted to the lower chord 128 of the rear spar 104 of FIGS. 1-9 and extends in an aft and/or rearward direction therefrom. When the outboard flap 106 of FIGS. 1-9 is in the stowed position shown in FIGS. 1-9, the spoiler 114 of FIGS. 1-9 extends between the upper fixed trailing edge panel 110 and the upper surface 136 of the outboard flap 106. As shown in FIGS. 1 and 2, the upper surface 126 of the aircraft wing 100 is formed by the upper fixed trailing edge panel 110, the spoiler 114, and the upper surface 136 of the outboard flap 106 when the outboard flap 106 is stowed. As further shown in FIGS. 1 and 2, the lower surface 130 of the aircraft wing 100 is formed by the lower fixed trailing edge panel 112 and the lower surface 138 of the outboard flap 106 when the outboard flap 106 is stowed.

The rear spar fitting 116 of FIGS. 1-9 is coupled and/or mounted to the rear spar 104 of FIGS. 1-9 at a location and/or position that is generally between the respective lateral locations and/or lateral positions of the outboard flap 106 of FIGS. 1-9 and the inboard flap 502 of FIGS. 5-9 along the spanwise direction of the rear spar 104. The rear spar fitting 116 includes a first end 144 located and/or positioned proximate the upper chord 124 of the rear spar 104 and/or proximate the upper fixed trailing edge panel 110, and a second end 146 located and/or positioned proximate the lower chord 128 of the rear spar 104 and/or proximate the lower fixed trailing edge panel 112. The rear spar fitting 116 is accordingly located and/or positioned between the upper fixed trailing edge panel 110 and the lower fixed trailing edge panel 112.

The deflection control rib 102 of FIGS. 1-9 is coupled and/or mounted to the rear spar fitting 116 of FIGS. 1-9 and extends in an aft and/or rearward direction therefrom such that the deflection control rib 102 is located and/or positioned between the closure rib 140 of the outboard flap 106 of FIGS. 1-9 and the closure rib 902 of the inboard flap 502 of FIGS. 5-9. As shown in FIGS. 5-7 and 9, the deflection control rib 102 of FIGS. 1-9 extends in an aft and/or rearward direction from the rear spar 104 of FIGS. 1-9 into a first gap 508 existing between the upper surface 136 of the outboard flap 106 and the upper surface 506 of the inboard flap 502. The first gap 508 is partially sealed by a first blade seal 510 coupled to the upper surface 136 of the outboard flap 106, and by a second blade seal 512 coupled to the upper surface 506 of the inboard flap 502.

The deflection control rib 102 of FIGS. 1-9 includes a primary arm 148 and a secondary arm 150. The primary arm 148 of the deflection control rib 102 includes a first end 152 and a second end 154 located opposite the first end 152. The first end 152 of the primary arm 148 is coupled to the first end 144 of the rear spar fitting 116. A through hole 156 is formed in the primary arm 148 of the deflection control rib 102 near the first end 152 of the primary arm 148. As shown in FIGS. 1, 2, 5 and 6, the electrical wiring bundle 118 of the aircraft wing 100 extends in the spanwise direction of the aircraft wing 100 through the through hole 156 of the primary arm 148 of the deflection control rib 102.

A roller arm 158 is coupled to the second end 154 of the primary arm 148 and extends transversely therethrough. The roller arm 158 includes a first end 402 (not visible in FIGS. 1-3) having a first roller 404 (not visible in FIGS. 1-3) coupled and/or mounted thereto, and a second end 160 located opposite the first end 402 and having a second roller 162 coupled and/or mounted thereto. When the outboard flap 106 of FIGS. 1-9 and the inboard flap 502 of FIGS. 5-9 are stowed as shown in FIGS. 1-9, the first roller 404 of the roller arm 158 engages and/or is positioned within the track 142 of the outboard flap 106, and the second roller 162 of the roller arm 158 engages and/or is positioned within the track 904 of the inboard flap 502.

The secondary arm 150 of the deflection control rib 102 of FIGS. 1-9 includes a first end 164 and a second end 166 located opposite the first end 164. The first end 164 of the secondary arm 150 is coupled to the second end 146 of the rear spar fitting 116. The second end 166 of the secondary arm 150 is integrally formed with the primary arm 148 of the deflection control rib 102 and is located aft and or rearward of the through hole 156 along the primary arm 148. As shown in FIG. 1, the aileron cable bundle 122 of the aircraft wing 100 extends in the spanwise direction of the aircraft wing 100 through a bounded area formed by the rear spar fitting 116, the primary arm 148 of the deflection control rib 102, and the secondary arm 150 of the deflection control rib 102.

As shown in FIGS. 7 and 9, a second gap 702 exists between the leading edge 132 of the outboard flap 106 and the leading edge 504 of the inboard flap 502. The second gap 702 is formed in part by a first cutout 704 in the leading edge 132 of the outboard flap 106 and a second cutout 706 in the leading edge 504 of the inboard flap 502. The first cutout 704 and the second cutout 706 of FIGS. 7 and 9 are respectively shaped to enable the outboard flap 106 and the inboard flap 502 to be fully deployed without interference from the roller arm 158, the first roller 404, and/or the second roller 162 of the deflection control rib 102 of FIGS. 1-9.

The tie rod 120 of the aircraft wing 100 of FIGS. 1-9 extends from the deflection control rib 102 of FIGS. 1-9 and provides support for the lower fixed trailing edge panel 112 of FIGS. 1-9. The tie rod 120 includes a first end 168 and a second end 170 located opposite the first end 168. The first end 168 of the tie rod 120 is coupled to the deflection control rib 102 proximate the junction between the primary arm 148 and the secondary arm 150 of the deflection control rib 102. The second end 170 of the tie rod 120 is coupled to the lower fixed trailing edge panel 112. As shown in FIG. 1, the flap drive 108 of the aircraft wing 100 extends in the spanwise direction of the aircraft wing 100 through a bounded area formed by the tie rod 120, the lower fixed trailing edge panel 112, and the secondary arm 150 of the deflection control rib 102.

The known deflection control rib 102 of FIGS. 1-9 increases the stiffness of the outboard flap 106 of FIGS. 1-9 and/or the inboard flap 502 of FIGS. 5-9 to reduce the potential for deflection of the outboard flap 106 and/or the inboard flap 502 relative to the rear spar 104 of the aircraft wing 100 when the outboard flap 106 and the inboard flap 502 are stowed. This benefit of the known deflection control rib 102, however, is undermined by several drawbacks and/or disadvantages associated with the known deflection control rib 102.

As one example drawback, the size of the roller arm 158 of the known deflection control rib 102 of FIGS. 1-9 and the structures supported on the roller arm 158 (e.g., the first roller 404 and the second roller 162) necessitates the first cutout 704 of the outboard flap 106 and the second cutout 706 of the inboard flap 502 of FIGS. 1-9. The existence of such cutouts in the respective leading edges of the flaps (e.g., the first cutout 704 in the leading edge 132 of the outboard flap 106, and the second cutout 706 in the leading edge 504 of the inboard flap 502) and the gap resulting therefrom (e.g., the second gap 702) decreases the aerodynamic performance of the aircraft wing 100 (e.g., by increasing drag) when the outboard flap 106 and/or the inboard flap 502 is/are deployed at low flight speeds and positioned at high detents (e.g., flaps 30, flaps 40, etc.).

As another example drawback, the size, location and arrangement of the known deflection control rib 102 of FIGS. 1-9 encourages the implementation of blade seals (e.g., the first blade seal 510 and the second blade seal 512) to narrow the gap existing between the outboard flap 106 and the inboard flap 502 of FIGS. 1-9 (e.g., the first gap 508). Such blade seals, however, only partially close the gap surrounding the known deflection control rib 102, and are not constructed to close off as much of the gap as possible. As a result, the aerodynamic performance of the aircraft wing 100 is negatively impacted when the outboard flap 106 and/or the inboard flap 502 is/are deployed at low flight speeds.

As another example drawback, the passage of the electrical wiring bundle 118 through the through hole 156 of the known deflection control rib 102 of FIGS. 1-9 complicates the internal design of the aircraft wing 100. This is particularly so with respect to the installation, removal, and/or replacement of the known deflection control rib 102.

The aircraft wings disclosed herein have deflection control ribs that are improved in many respects relative to the known deflection control rib 102 of the known aircraft wing 100 of FIGS. 1-9 described above. As one example benefit, the improved deflection control ribs disclosed herein incorporate a catch instead of the roller arm 158 of the known deflection control rib 102 of FIGS. 1-9. The catch of the improved deflection control rib has a shape that reduces (e.g., eliminates) any need for cutouts in the respective leading edges of the outboard and inboard flaps. For example, the catch may be shaped to have a maximum width and/or a maximum lateral thickness that is less than a width (e.g., a minimum width) of a gap existing between the leading edge of the outboard flap proximate the lower surface of the outboard flap, and the leading edge of the inboard flap proximate the lower surface of the inboard flap. The absence of cutouts from the respective leading edges of the flaps advantageously increases the aerodynamic performance (e.g., decreases drag) associated with the aircraft wing when the outboard flap and/or the inboard flap is/are deployed at low flight speeds and positioned at high detents (e.g., flaps 30, flaps 40, etc.).

As another example benefit, the size, shape, location, and/or arrangement of the improved deflection control rib advantageously enables the implementation of sculpted bulb seals that substantially close the gap existing between the outboard flap and the inboard flap. Such sculpted bulb seals are constructed to close off as much of the gap as possible. As a result, the aerodynamic performance of the aircraft wing is advantageously increased (e.g., by decreasing drag) when the outboard flap and/or the inboard flap is/are deployed at low flight speeds.

As another example benefit, the size, shape, location, and/or arrangement of the improved deflection control rib advantageously eliminates the passage of the electrical wiring bundle through any portion of the deflection control rib. Freeing the electrical wiring bundle from the spatial confines of the deflection control rib simplifies the design of the deflection control rib and/or the internal design of the aircraft wing. This benefit is particularly advantageous with respect to improving the ease by which the improved deflection control rib may be installed, removed, and/or replaced relative to the difficulties encountered when installing, removing, and/or replacing the known deflection control rib 102 of FIGS. 1-9. These and other advantages attributable to the improved deflection control ribs disclosed herein will be further appreciated based on the description that follows.

Figure 10:
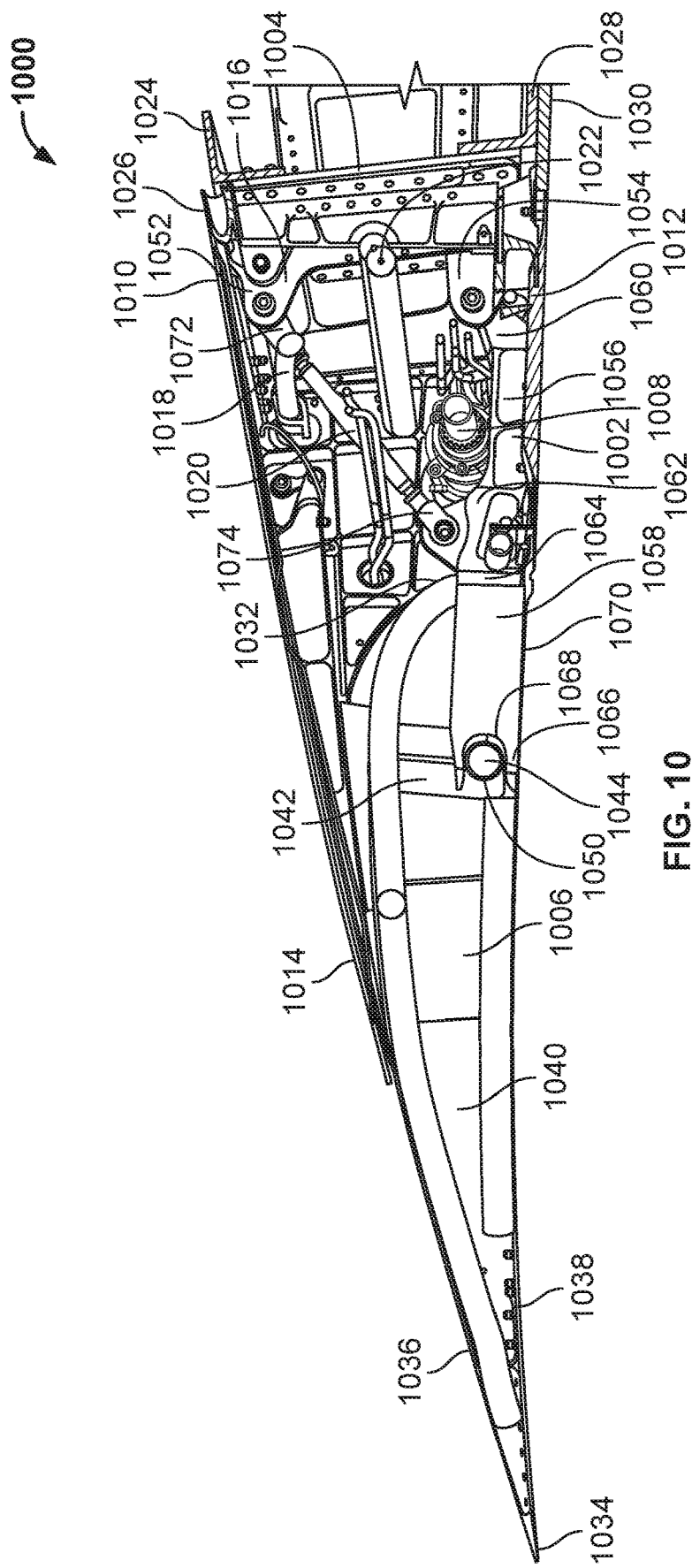
FIG. 10 is a cross-sectional view of an example aircraft wing having an example deflection control rib constructed in accordance with the teachings of this disclosure.
Figure 11:
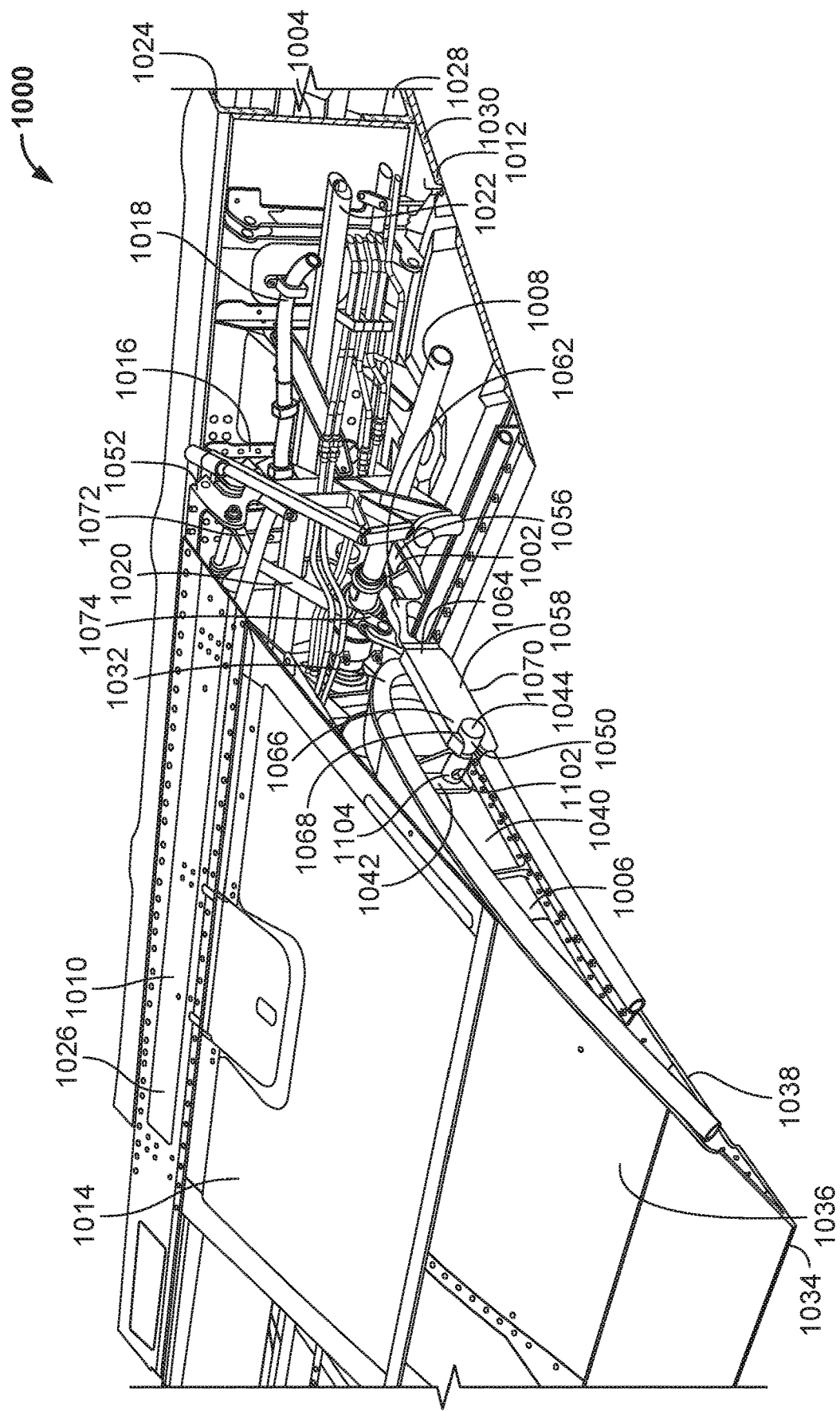
FIG. 11 is a first partial cutaway perspective view of the example aircraft wing of FIG. 10 including the example deflection control rib of FIG. 10.
Figure 12:
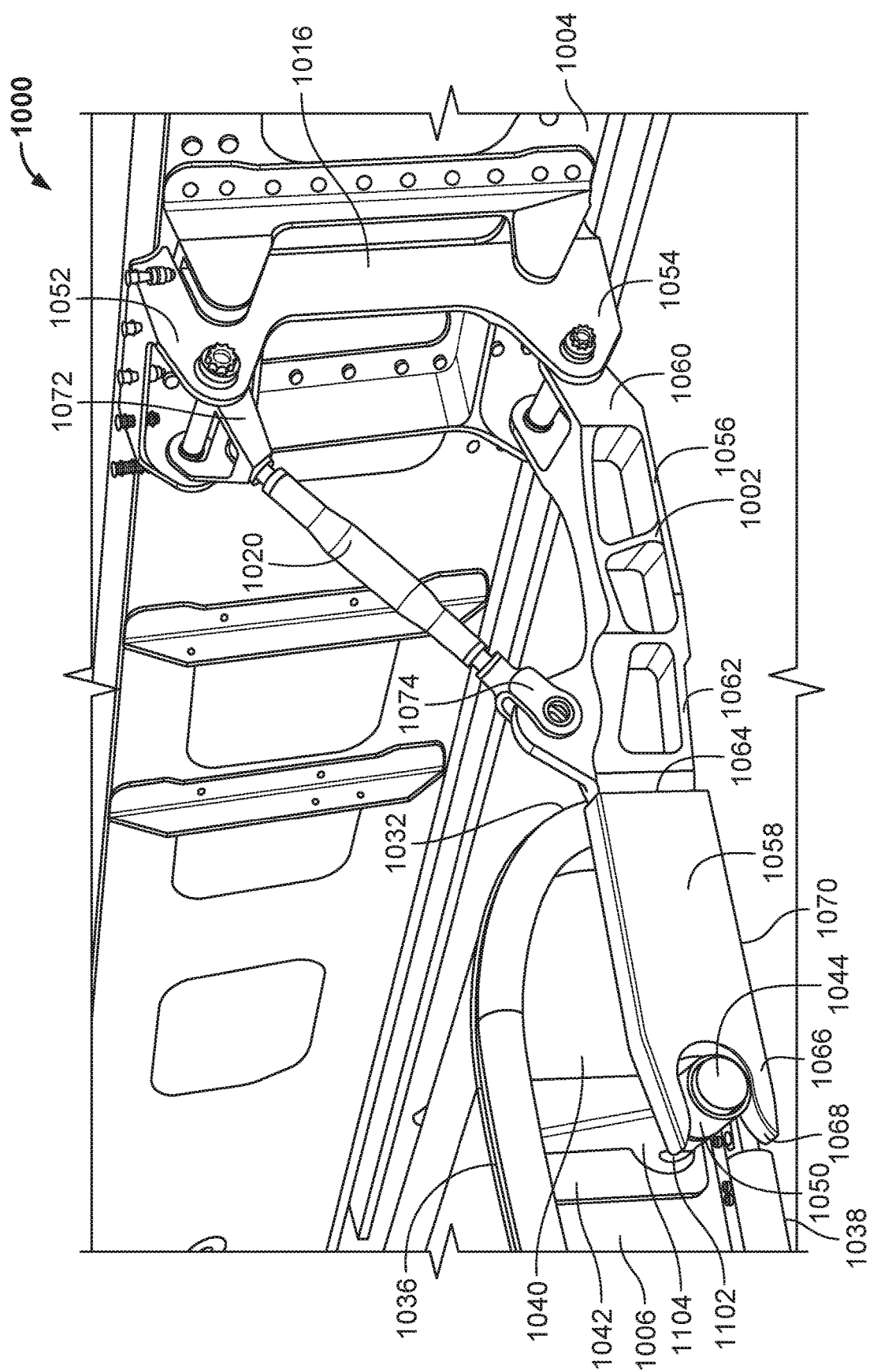
FIG. 12 is a second partial cutaway perspective view of the example aircraft wing of FIGS. 10 and 11 including the example deflection control rib of FIGS. 10 and 11.
Figure 13:
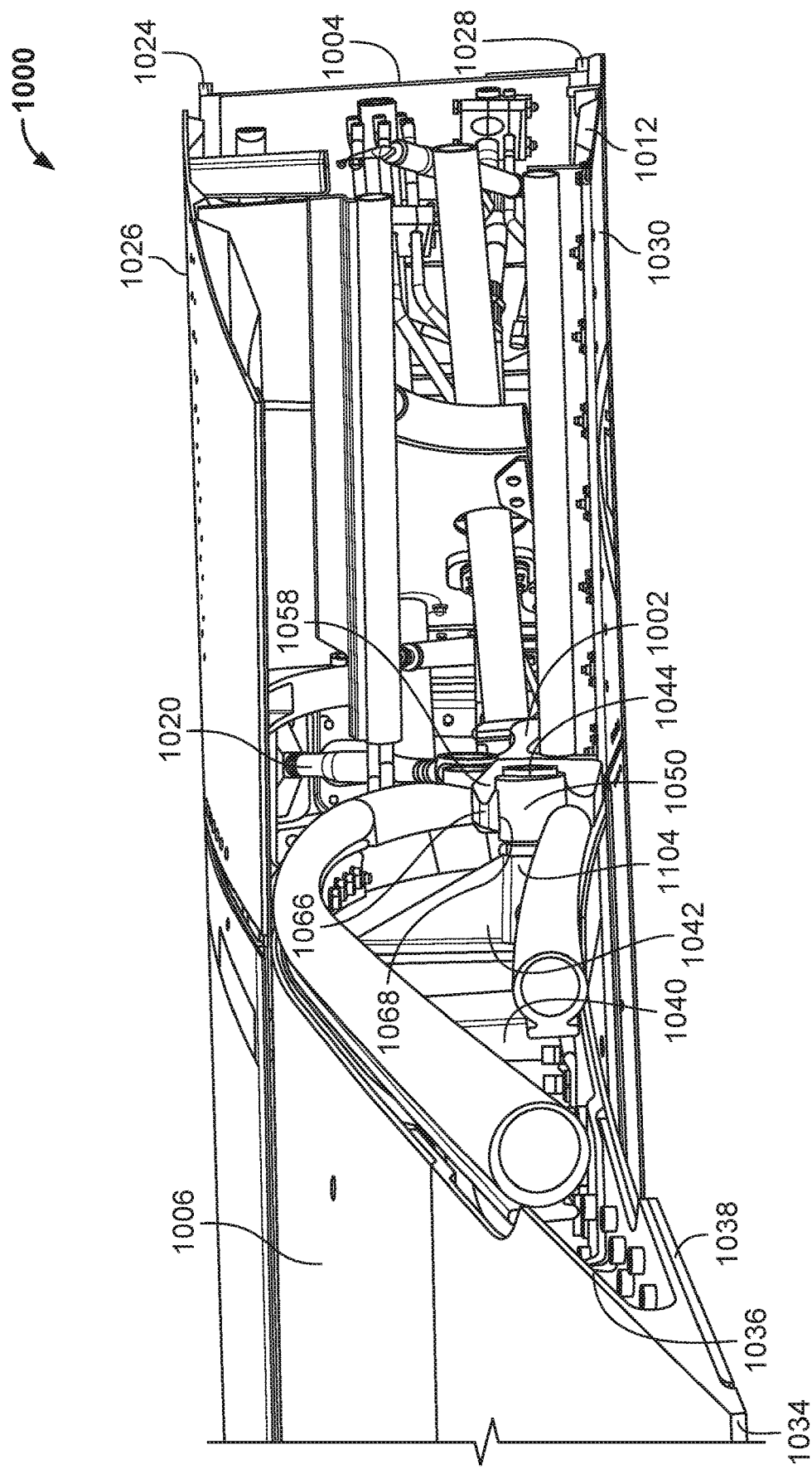
FIG. 13 is a third partial cutaway perspective view of the example aircraft wing of FIGS. 10-12 including the example deflection control rib of FIGS. 10-12.
Figure 14:
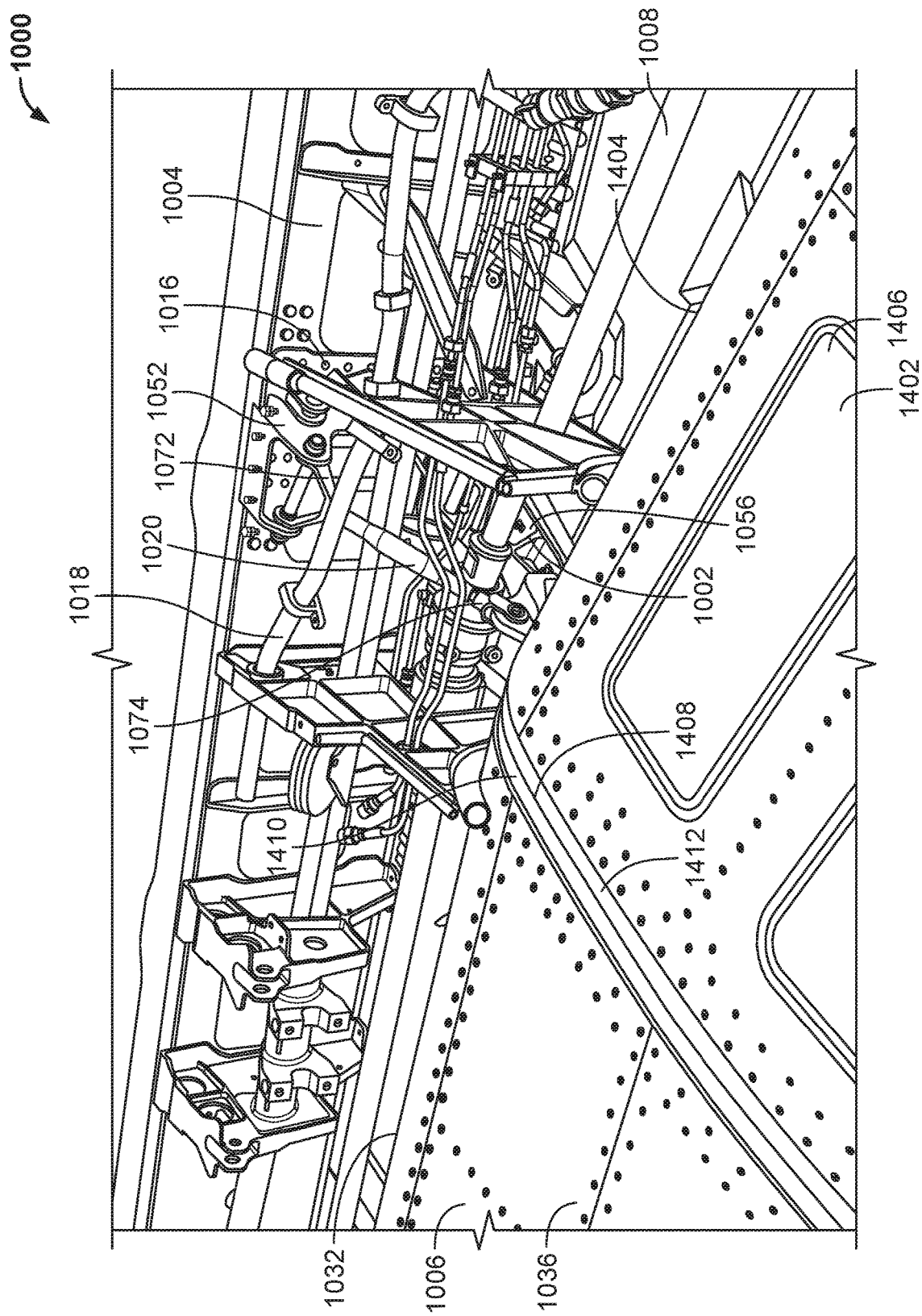
FIG. 14 is a fourth partial cutaway perspective view of the example aircraft wing of FIGS. 10-13 including the example deflection control rib of FIGS. 10-13.
Figure 15:
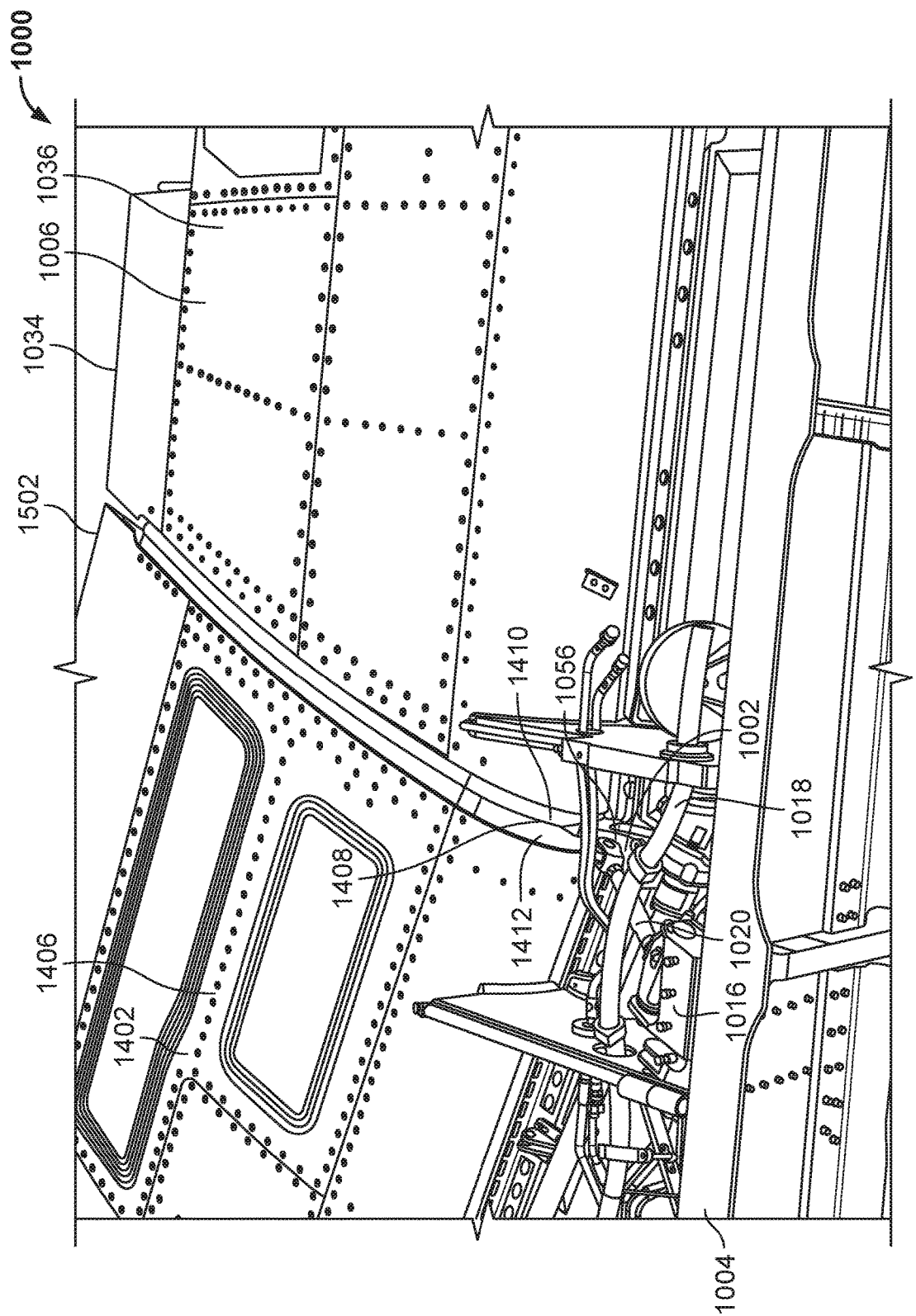
FIG. 15 is a fifth partial cutaway perspective view of the example aircraft wing of FIGS. 10-14 including the example deflection control rib of FIGS. 10-14.
Figure 16:
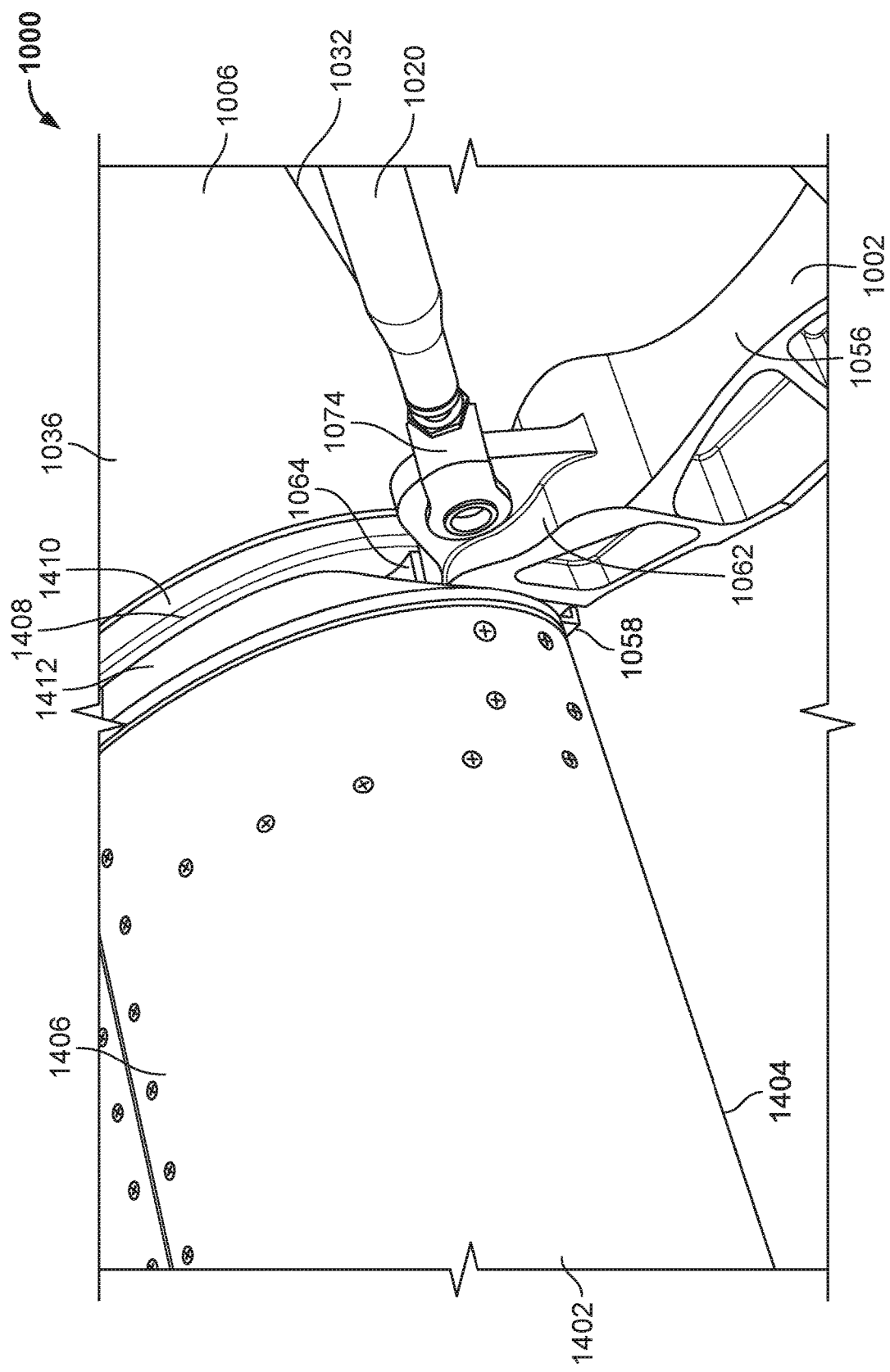
FIG. 16 is a sixth partial cutaway perspective view of the example aircraft wing of FIGS. 10-15 including the example deflection control rib of FIGS. 10-15.
Figure 17:
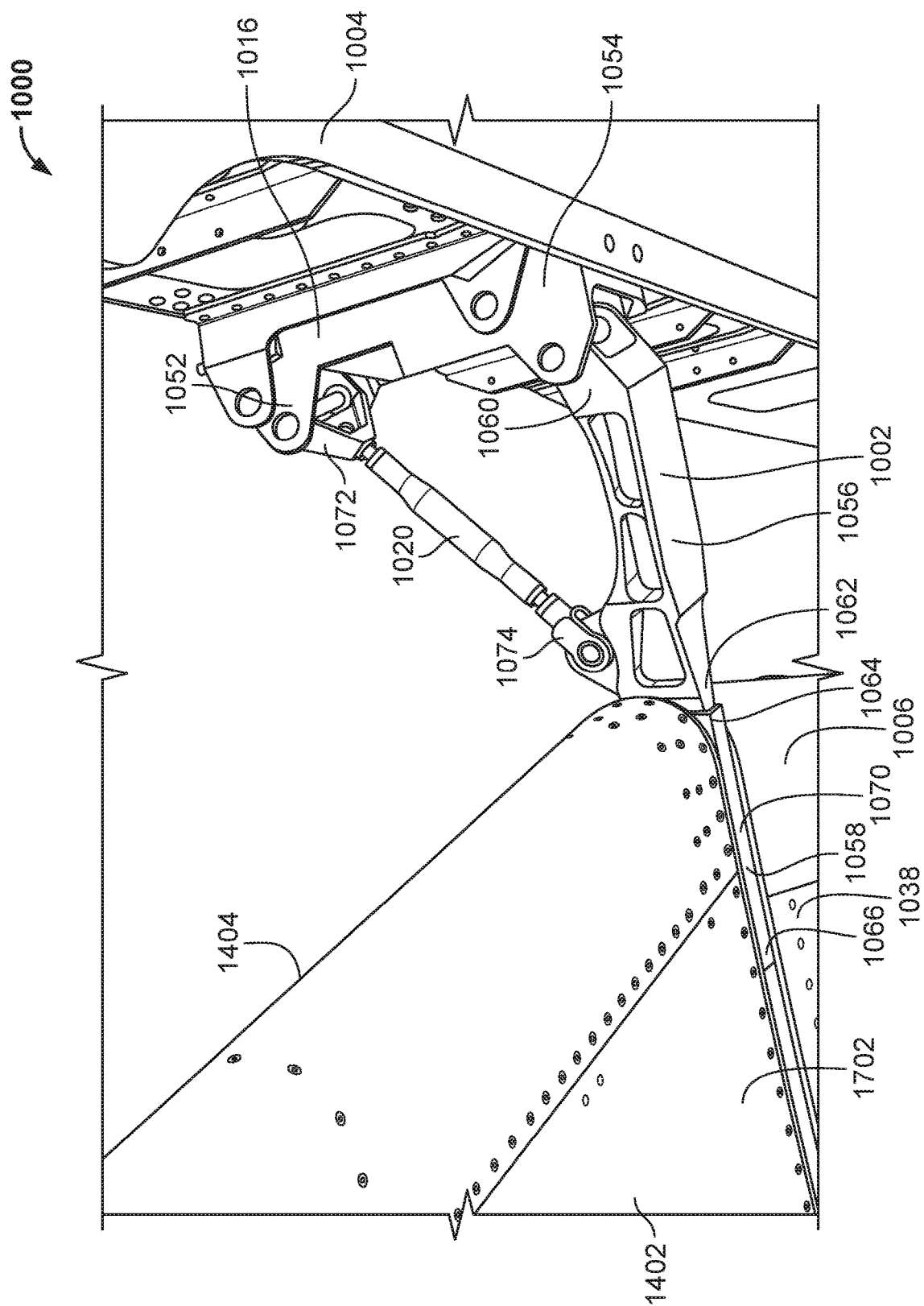
FIG. 17 is a seventh partial cutaway perspective view of the example aircraft wing of FIGS. 10-16 including the example deflection control rib of FIGS. 10-16.
Figure 18:
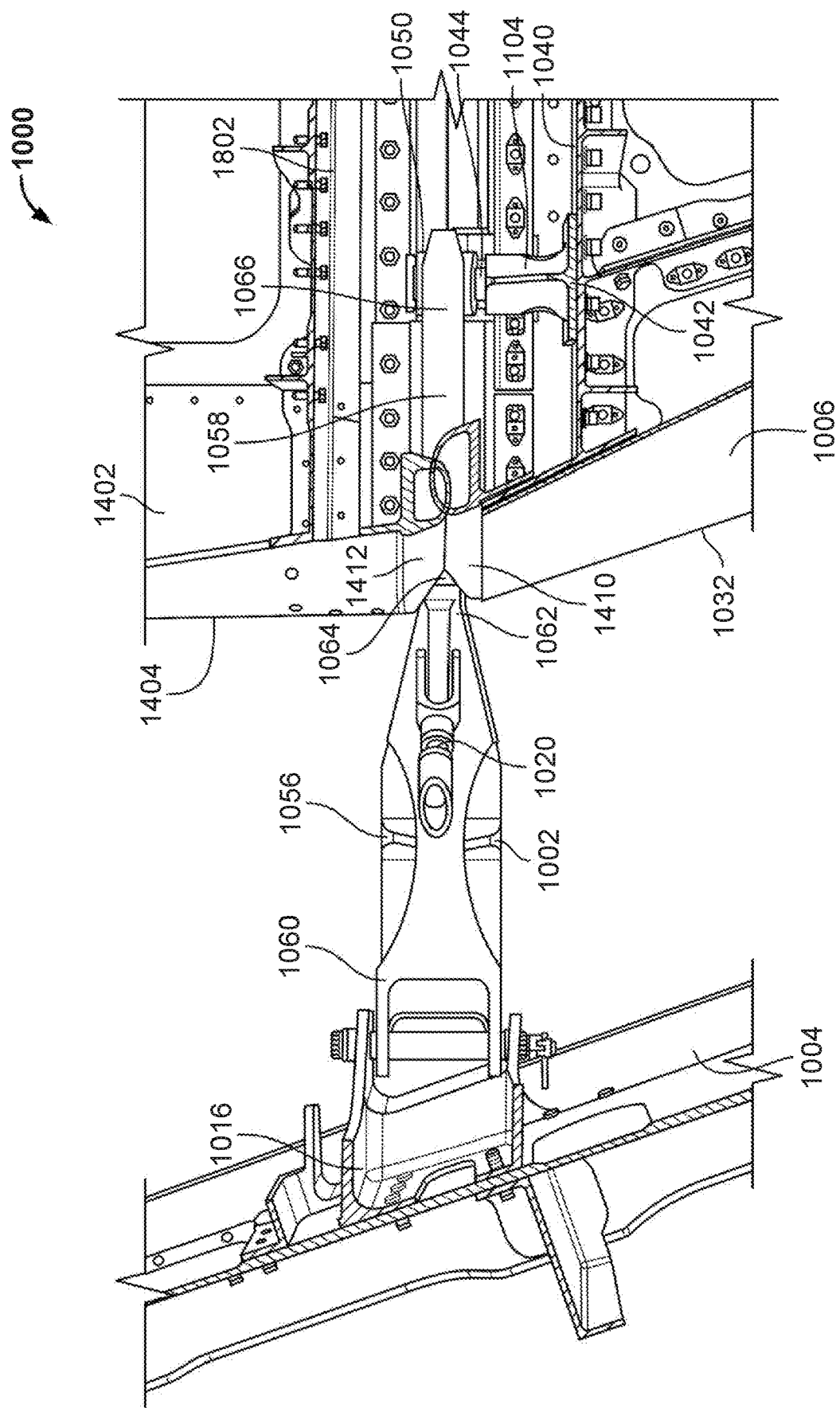
FIG. 18 is a partial cutaway plan view of the example aircraft wing of FIGS. 10-17 including the example deflection control rib of FIGS. 10-17.

FIG. 10 is a cross-sectional view of an example aircraft wing 1000 having an example deflection control rib 1002 constructed in accordance with the teachings of this disclosure. FIG. 11 is a first partial cutaway perspective view of the example aircraft wing 1000 of FIG. 10 including the example deflection control rib 1002 of FIG. 10. FIG. 12 is a second partial cutaway perspective view of the example aircraft wing 1000 of FIGS. 10 and 11 including the example deflection control rib 1002 of FIGS. 10 and 11. FIG. 13 is a third partial cutaway perspective view of the example aircraft wing 1000 of FIGS. 10-12 including the example deflection control rib 1002 of FIGS. 10-12. FIG. 14 is a fourth partial cutaway perspective view of the example aircraft wing 1000 of FIGS. 10-13 including the example deflection control rib 1002 of FIGS. 10-13. FIG. 15 is a fifth partial cutaway perspective view of the example aircraft wing 1000 of FIGS. 10-14 including the example deflection control rib 1002 of FIGS. 10-14. FIG. 16 is a sixth partial cutaway perspective view of the example aircraft wing 1000 of FIGS. 10-15 including the example deflection control rib 1002 of FIGS. 10-15. FIG. 17 is a seventh partial cutaway perspective view of the example aircraft wing 1000 of FIGS. 10-16 including the example deflection control rib 1002 of FIGS. 10-16. FIG. 18 is a partial cutaway plan view of the example aircraft wing 1000 of FIGS. 10-17 including the example deflection control rib 1002 of FIGS. 10-17.

The aircraft wing 1000 of FIGS. 10-18 includes the deflection control rib 1002, an example rear spar 1004, an example outboard flap 1006, an example flap drive 1008, an example upper fixed trailing edge panel 1010, an example lower fixed trailing edge panel 1012, an example spoiler 1014, an example rear spar fitting 1016, an example electrical wiring bundle 1018, an example adjustable tie rod 1020, and an example aileron cable bundle 1022. The rear spar 1004 of FIGS. 10-18 extends in a spanwise direction along a portion of the aircraft wing 1000. In the illustrated example of FIGS. 10-18, the rear spar 1004 includes an example upper chord 1024 located proximate an example upper surface 1026 of the aircraft wing 1000, and an example lower chord 1028 located opposite the upper chord 1024 proximate an example lower surface 1030 of the aircraft wing 1000.

The outboard flap 1006 of FIGS. 10-18 extends along a portion of the rear spar 1004 of FIGS. 10-19 and is movably coupled thereto via a deployment mechanism (not shown) driven and/or controlled via the flap drive 1008 of FIGS. 10-18. Actuation of the flap drive 1008 causes the outboard flap 1006 to move relative to the rear spar 1004 between the stowed position shown in FIGS. 10-18 and a deployed position in which the outboard flap 1006 is spaced further away from the rear spar 1004 relative to the spacing associated with the stowed position shown in FIGS. 10-18. In the illustrated example of FIGS. 10-18, the outboard flap 1006 includes an example leading edge 1032, an example trailing edge 1034 located aft and/or rearward of the leading edge 1032, an example upper surface 1036 extending between the leading edge 1032 and the trailing edge 1034, an example lower surface 1038 located opposite the upper surface 1036 and also extending between the leading edge 1032 and the trailing edge 1034, an example closure rib 1040 extending between the leading edge 1032, the trailing edge 1034, the upper surface 1036 and the lower surface 1038, and an example closure rib fitting 1042 coupled to and/or mounted on the closure rib 1040.

In the illustrated example of FIGS. 10-18, an example roller arm 1044 is coupled to the closure rib fitting 1042 via an example nut 1102 positioned in an example spigot 1104 of the closure rib fitting 1042. The roller arm 1044 includes an example roller 1050 coupled and/or mounted thereto. In the illustrated example of FIGS. 10-18, the roller arm 1044 and the roller 1050 extend transversely from the closure rib fitting 1042 in a direction away from the closure rib 1040 of the outboard flap 1006 of FIGS. 10-18. The above-described configuration of the closure rib fitting 1042, the roller arm 1044, the roller 1050, the nut 1102, and the spigot 1104 advantageously enables the roller 1050 and/or the roller arm 1044 to be removed and replaced from the outboard flap 1006 without the need to physically enter the volume of the outboard flap 1006 defined and/or bounded by the closure rib 1040. Maintenance of the closure rib fitting 1042, the roller arm 1044, the roller 1050, the nut 1102, and/or the spigot 1104 of the outboard flap 1006 is accordingly simplified.

As shown in FIGS. 14-18, the aircraft wing 1000 of FIGS. 10-18 further includes an example inboard flap 1402 located laterally adjacent the outboard flap 1006 of FIGS. 10-18 along the spanwise direction of the rear spar 1004 and/or the aircraft wing 1000 of FIGS. 10-18. The inboard flap 1402 of FIGS. 14-18 extends along a portion of the rear spar 1004 of FIGS. 10-18 and is movably coupled thereto via a deployment mechanism (not shown) driven and/or controlled via the flap drive 1008 of FIGS. 10-18. Actuation of the flap drive 1008 causes the inboard flap 1402 to move relative to the rear spar 1004 between the stowed position shown in FIGS. 14-18 and a deployed position in which the inboard flap 1402 is spaced further away from the rear spar 1004 relative to the spacing associated with the stowed position shown in FIGS. 14-18. In the illustrated example of FIGS. 14-18, the inboard flap 1402 includes an example leading edge 1404, an example trailing edge 1502 located aft and/or rearward of the leading edge 1504, an example upper surface 1406 extending between the leading edge 1404 and the trailing edge 1502, an example lower surface 1702 located opposite the upper surface 1406 and also extending between the leading edge 1404 and the trailing edge 1502, and an example closure rib 1802 extending between the leading edge 1404, the trailing edge 1502, the upper surface 1406 and the lower surface 1702.

In the illustrated example of FIGS. 14-18, the closure rib 1802 of the inboard flap 1402 does not include a closure rib fitting corresponding to the above-described closure rib fitting 1042 of the closure rib 1040 of the outboard flap 1006 of FIGS. 10-18. Nor does the closure rib 1802 of the inboard flap 1402 of FIGS. 14-18 include a roller arm or roller corresponding to the above-described roller arm 1044 or roller 1050 of the outboard flap 1006 of FIGS. 10-18. As a result, deflection of the inboard flap 1402 of FIGS. 14-18 is not controlled via the deflection control rib 1002 of FIGS. 10-18. The deflection control rib 1002 of FIGS. 10-18 accordingly increases the stiffness of only the outboard flap 1006 of FIGS. 10-18 to reduce the potential for deflection of the outboard flap 1006 relative to the rear spar 1004 of the aircraft wing 1000 of FIGS. 10-18 when the outboard flap 1006 and the inboard flap 1402 are stowed. In other examples, the inboard flap 1402 of FIGS. 14-18 may be modified to include a closure rib fitting, a roller arm, and a roller corresponding to the above-described closure rib fitting 1042, roller arm 1044, and roller 1050 of the outboard flap 1006 of FIGS. 10-18 to enable deflection of the inboard flap 1402 to be controlled via a modified version of the deflection control rib 1002 of FIGS. 10-18. In such other examples, the deflection control rib 1002 of FIGS. 10-18 may accordingly increase the stiffness of both the outboard flap 1006 of FIGS. 10-18 and the inboard flap 1402 of FIGS. 14-18 to reduce the potential for deflection of the outboard flap 1006 and the inboard flap 1402 relative to the rear spar 1004 of the aircraft wing 1000 of FIGS. 10-18 when the outboard flap 1006 and the inboard flap 1402 are stowed.

In the illustrated example of FIGS. 10-18, the upper fixed trailing edge panel 1010 is coupled and/or mounted to the upper chord 1024 of the rear spar 1004 of FIGS. 10-18 and extends in an aft and/or rearward direction therefrom. The lower fixed trailing edge panel 1012 of FIGS. 10-18 is coupled and/or mounted to the lower chord 1028 of the rear spar 1004 of FIGS. 10-18 and extends in an aft and/or rearward direction therefrom. When the outboard flap 1006 of FIGS. 10-18 is in the stowed position shown in FIGS. 10-18, the spoiler 1014 of FIGS. 10-18 extends between the upper fixed trailing edge panel 1010 and the upper surface 1036 of the outboard flap 1006. As shown in FIGS. 10 and 11, the upper surface 1026 of the aircraft wing 1000 is formed by the upper fixed trailing edge panel 1010, the spoiler 1014, and the upper surface 1036 of the outboard flap 1006 when the outboard flap 1006 is stowed. As further shown in FIGS. 10 and 11, the lower surface 1030 of the aircraft wing 1000 is formed in part by the lower fixed trailing edge panel 1012 and the lower surface 1038 of the outboard flap 1006 when the outboard flap 1006 is stowed. As further described below in connection with the illustrated example of FIGS. 10-18, a portion of the deflection control rib 1002 of FIGS. 10-18 may additionally form part of the lower surface 1030 of the aircraft wing 1000 of FIGS. 10-18 when the outboard flap 1006 of FIGS. 10-18 is stowed.

The rear spar fitting 1016 of FIGS. 10-18 is coupled and/or mounted to the rear spar 1004 of FIGS. 10-18 at a location and/or position that is generally between the respective lateral locations and/or lateral positions of the outboard flap 1006 of FIGS. 10-18 and the inboard flap 1402 of FIGS. 14-18 along the spanwise direction of the rear spar 1004. In the illustrated example of FIGS. 10-18, the rear spar fitting 1016 includes an example first end 1052 located and/or positioned proximate the upper chord 1024 of the rear spar 1004 and/or proximate the upper fixed trailing edge panel 1010, and an example second end 1054 located and/or positioned proximate the lower chord 1028 of the rear spar 1004 and/or proximate the lower fixed trailing edge panel 1012. The rear spar fitting 1016 is accordingly located and/or positioned between the upper fixed trailing edge panel 1010 and the lower fixed trailing edge panel 1012.

The deflection control rib 1002 of FIGS. 10-18 is coupled and/or mounted to the rear spar fitting 1016 of FIGS. 10-18 and extends in an aft and/or rearward direction therefrom such that the deflection control rib 1002 is located and/or positioned between the closure rib 1040 of the outboard flap 1006 of FIGS. 10-18 and the closure rib 1802 of the inboard flap 1402 of FIGS. 14-18. In the illustrated example of FIGS. 10-18, the deflection control rib 1002 extends along the lower fixed trailing edge panel 1012 (e.g., adjacent the lower fixed trailing edge panel 1012) in an aft and/or rearward direction from the rear spar 1004 of FIGS. 10-18 into an example gap 1408 existing between the leading edge 1032 of the outboard flap 1006 proximate the lower surface 1038 of the outboard flap 1006, and the leading edge 1404 of the inboard flap 1402 proximate the lower surface 1702 of the inboard flap 1402. The gap 1408 is partially sealed by an example first sculpted bulb seal 1410 coupled to the leading edge 1032 and/or the upper surface 1036 of the outboard flap 1006, and by an example second sculpted bulb seal 1412 coupled to the leading edge 1404 and/or the upper surface 1406 of the inboard flap 1402. As shown in FIGS. 16 and 18, the first sculpted bulb seal 1410 and the second sculpted bulb seal 1412 are respectively shaped and/or sculpted around the deflection control rib 1002 to cover and/or seal the majority of the gap 1408 proximate the respective lower portion of the leading edge 1032 of the outboard flap 1006 and the lower portion of the leading edge 1404 of the inboard flap 1402.

In the illustrated example of FIGS. 10-18, the deflection control rib 1002 includes an example primary arm 1056 and an example catch 1058 coupled and/or mounted to the primary arm 1056. The primary arm 1056 of the deflection control rib 1002 of FIGS. 10-18 includes an example first end 1060 and an example second end 1062 located opposite the first end 1060. The first end 1060 of the primary arm 1056 of FIGS. 10-18 is coupled to the second end 1054 of the rear spar fitting 1016. In the illustrated example of FIGS. 10-18, the primary arm 1056 of the deflection control rib 1002 does not include a through hole corresponding to the above-described through hole 156 of the primary arm 148 of the deflection control rib 102 of FIGS. 1-9. Accordingly, as shown in FIGS. 10, 11, 14 and 15, the electrical wiring bundle 1018 of the aircraft wing 1000 extends in the spanwise direction of the aircraft wing 1000 but does not extend through the primary arm 1056 of the deflection control rib 1002.

In the illustrated example of FIGS. 10-18, the catch 1058 of the deflection control rib 1002 includes an example first end 1064 and an example second end 1066 located opposite the first end 1064. The first end 1064 of the catch 1058 of FIGS. 10-18 is coupled and/or mounted to the second end 1062 of the primary arm 1056 of the deflection control rib 1002 such that the catch 1058 extends in an aft and/or rearward direction from the primary arm 1056. In the illustrated example of FIGS. 10-18, the second end 1066 of the catch 1058 includes an example opening 1068 that catches and/or otherwise receives the roller arm 1044 and/or roller 1050 of the outboard flap 1006 of FIGS. 10-18 when the outboard flap 1006 is in the stowed position shown in FIGS. 10-18. Stated differently, the roller 1050 of the roller arm 1044 of the outboard flap 1006 of FIGS. 10-18 engages and/or is positioned within the opening 1068 of the catch 1058 of the deflection control rib 1002 of FIGS. 10-18 when the outboard flap 1006 is stowed.

In the illustrated example of FIGS. 10-18, the catch 1058 further includes an example lower surface 1070 positioned in the portion of the gap 1408 existing between the lower surface 1038 of the outboard flap 1006 of FIGS. 10-18 and the lower surface 1702 of the inboard flap 1402 of FIGS. 14-18. The lower surface 1030 of the aircraft wing 1000 is accordingly formed by the lower fixed trailing edge panel 1012, the lower surface 1070 of the catch 1058, and the lower surface 1038 of the outboard flap 1006 when the outboard flap 1006 is stowed. In the illustrated example of FIGS. 10-18, the lower surface 1070 of the catch 1058 functions as a fairing that reduces drag along the lower surface 1030 of the aircraft wing 1000 when the outboard flap 1006 is stowed. In some examples, the material from which the catch 1058 is formed is tailored to the known and/or anticipated operating environments and/or operating loads of the aircraft wing 1000. In some examples, the catch 1058 is removably coupled to the primary arm 1056 of the deflection control rib 1002 such that the catch 1058 may be removed and replaced in the event of excessive wear during service.

The adjustable tie rod 1020 of the aircraft wing 1000 of FIGS. 10-18 extends from and provides support for the deflection control rib 1002 of FIGS. 10-18. In the illustrated example of FIGS. 10-18, the adjustable tie rod 1020 includes an example first end 1072 and an example second end 1074 located opposite the first end 1072. The first end 1072 of the adjustable tie rod 1020 of FIGS. 10-18 is coupled to the first end 1052 of the rear spar fitting 1016 of FIGS. 10-18. The second end 1074 of the adjustable tie rod 1020 of FIGS. 10-18 is coupled to the second end 1062 of the primary arm 1056 of the deflection control rib 1002 of FIGS. 10-18. As shown in FIG. 10, the flap drive 1008 and the aileron cable bundle 1022 of the aircraft wing 1000 of FIGS. 10-18 extend in the spanwise direction of the aircraft wing 1000 through a bounded area formed by the adjustable tie rod 1020, the primary arm 1056 of the deflection control rib 1002, and the rear spar fitting 1016 of FIGS. 10-18. The length of the adjustable tie rod 1020 of FIGS. 10-18 may be adjusted (e.g., increased or decreased) during a rigging operation associated with the aircraft wing 1000 of FIGS. 10-18 to position the lower surface 1070 of the catch 1058 of the deflection control rib 1002 of FIGS. 10-18 within the portion of the gap 1408 existing between the lower surface 1038 of the outboard flap 1006 and the lower surface 1702 of the inboard flap 1402 of FIGS. 10-18 such that the lower surface 1070 of the catch 1058 is flush with the lower surface 1038 of the outboard flap 1006 and/or the lower surface 1702 of the inboard flap 1402.

From the foregoing, it will be appreciated that the disclosed aircraft wings advantageously include improved deflection control ribs. An example improved deflection control rib disclosed herein incorporates a catch having a shape (e.g., a maximum width and/or maximum lateral thickness) that advantageously reduces (e.g., eliminates) any need for cutouts in the respective leading edges of the outboard and inboard flaps of the aircraft wing. The absence of such cutouts from the respective leading edges of the flaps advantageously increases the aerodynamic performance (e.g., decreases drag) associated with the aircraft wing when the outboard flap and/or the inboard flap is/are deployed at low flight speeds and positioned at high detents (e.g., flaps 30, flaps 40, etc.). The size, shape, location, and/or arrangement of the improved deflection control rib advantageously enables the implementation of sculpted bulb seals that substantially close the gap existing between the outboard flap and the inboard flap, thereby further increasing the aerodynamic performance of the aircraft wing. The size, shape, location, and/or arrangement of the improved deflection control rib also advantageously eliminates the passage of the electrical wiring bundle through any portion of the deflection control rib. Freeing the electrical wiring bundle from the spatial confines of the deflection control rib simplifies the design of the deflection control rib and/or the internal design of the aircraft wing. This benefit is particularly advantageous with respect to improving the ease by which the improved deflection control rib may be installed, removed, and/or replaced relative to the difficulties encountered when installing, removing, and/or replacing the known deflection control rib 102 of FIGS. 1-9.

In some examples, an aircraft wing is disclosed. In some disclosed examples, the aircraft wing comprises a rear spar, an outboard flap, a rear spar fitting, and a deflection control rib. In some disclosed examples, the outboard flap is movable relative to the rear spar between a stowed position and a deployed position. In some disclosed examples, the outboard flap includes a closure rib and a roller coupled to the closure rib. In some disclosed examples, the rear spar fitting is coupled to the rear spar. In some disclosed examples, the deflection control rib includes a primary arm and a catch. In some disclosed examples, the primary arm is coupled to and extends rearward from the rear spar fitting proximate a lower surface of the aircraft wing. In some disclosed examples, the catch is coupled to and extends rearward from the primary arm. In some disclosed examples, the catch includes an opening to receive the roller of the outboard flap when the outboard flap is in the stowed position.

In some disclosed examples, the rear spar fitting includes a first end and a second end located opposite the first end of the rear spar fitting. In some disclosed examples, the primary arm of the deflection control rib includes a first end and a second end located opposite the first end of the primary arm.

In some disclosed examples, the catch of the deflection control rib includes a first end and a second end located opposite the first end of the catch. In some disclosed examples, the first end of the primary arm is coupled to the second end of the rear spar fitting. In some disclosed examples, the first end of the catch is coupled to the second end of the primary arm. In some disclosed examples, the opening of the catch is located at the second end of the catch.

In some disclosed examples, the aircraft wing further comprises a tie rod. In some disclosed examples, the tie rod includes a first end and a second end located opposite the first end of the tie rod. In some disclosed examples, the first end of the tie rod is coupled to the first end of the rear spar fitting. In some disclosed examples, the second end of the tie rod is coupled to the second end of the primary arm of the deflection control rib. In some disclosed examples, a length of the tie rod is adjustable to align a lower surface of the catch with a lower surface of the outboard flap when the outboard flap is in the stowed position.

In some disclosed examples, the outboard flap further includes a closure rib fitting coupled to the closure rib. In some disclosed examples, the closure rib fitting has a spigot extending away from the closure rib and further has a nut located within the spigot. In some disclosed examples, the outboard flap further includes a roller arm positioned within and extending from the spigot. In some disclosed examples, the roller arm is coupled to the spigot via the nut. In some disclosed examples, the roller is mounted on the roller arm. In some disclosed examples, the roller is coupled to the closure rib via the roller arm, the nut, the spigot, and the closure rib fitting.

In some disclosed examples, the outboard flap further includes a leading edge, a trailing edge located rearward of the leading edge, an upper surface extending between the leading edge and the trailing edge, and a lower surface located opposite the upper surface and extending between the leading edge and the trailing edge. In some disclosed examples, the closure rib of the outboard flap extends between the leading edge of the outboard flap, the trailing edge of the outboard flap, the upper surface of the outboard flap, and the lower surface of the outboard flap.

In some disclosed examples, the aircraft further comprises an inboard flap separated from the outboard flap by a gap. In some disclosed examples, the inboard flap includes a leading edge, a trailing edge located rearward of the leading edge of the inboard flap, an upper surface extending between the leading edge of the inboard flap and the trailing edge of the inboard flap, a lower surface located opposite the upper surface of the inboard flap and extending between the leading edge of the inboard flap and the trailing edge of the inboard flap, and a closure rib extending between the leading edge of the inboard flap, the trailing edge of the inboard flap, the upper surface of the inboard flap, and the lower surface of the inboard flap.

In some disclosed examples, the deflection control rib is to extend into a portion of the gap existing between the leading edge of the outboard flap proximate the lower surface of the outboard flap and the leading edge of the inboard flap proximate a lower surface of the inboard flap when the outboard flap and the inboard flap are stowed. In some disclosed examples, the gap is partially sealed via a first sculpted bulb seal coupled to the leading edge of the outboard flap and via a second sculpted bulb seal coupled to the leading edge of the inboard flap.

In some disclosed examples, a lower surface of the catch is to be positioned in a portion of the gap existing between the lower surface of the outboard flap and the lower surface of the inboard flap. In some disclosed examples, the lower surface of the catch is to be approximately flush with the lower surface of the outboard flap and the lower surface of the inboard flap when the outboard flap and the inboard flap are stowed.

In some disclosed examples, the leading edge of the outboard flap and the leading edge of the inboard flap do not have (e.g., are free of) cutouts.

In some disclosed examples, the aircraft wing further comprises an electrical wiring bundle extending in a spanwise direction of the aircraft wing. In some disclosed examples, the electrical wiring bundle does not pass through the deflection control rib (e.g., the deflection control rib is free of the electrical wiring bundle).

In some examples, a deflection control rib is disclosed. In some disclosed examples, the deflection control rib comprises a primary arm and a catch. In some disclosed examples, the primary arm is to be coupled to and extend rearward from a rear spar fitting of an aircraft wing proximate a lower surface of the aircraft wing. In some disclosed examples, the rear spar fitting is to be coupled to a rear spar of the aircraft wing. In some disclosed examples, the catch is coupled to and extends rearward from the primary arm. In some disclosed examples, the catch includes an opening to receive a roller of an outboard flap of the aircraft wing when the outboard flap is in a stowed position. In some disclosed examples, the outboard flap is to be movable relative to the rear spar between the stowed position and a deployed position. In some disclosed examples, the outboard flap is to include a closure rib and the roller. In some disclose examples, the roller is to be coupled to the closure rib.

In some disclosed examples, the rear spar fitting is to include a first end and a second end located opposite the first end of the rear spar fitting. In some disclosed examples, the primary arm of the deflection control rib includes a first end and a second end located opposite the first end of the primary arm. In some disclosed examples, the catch of the deflection control rib includes a first end and a second end located opposite the first end of the catch. In some disclosed examples, the first end of the primary arm is to be coupled to the second end of the rear spar fitting. In some disclosed examples, the first end of the catch is coupled to the second end of the primary arm. In some disclosed examples, the opening of the catch is located at the second end of the catch.

In some disclosed examples, the second end of the primary arm of the deflection control rib is to be coupled to the first end of the rear spar fitting via a tie rod. In some disclosed examples, the tie rod is to extend between the second end of the primary arm and the first end of the rear spar fitting.

In some examples, an outboard flap is disclosed. In some disclosed examples, the outboard flap comprises a closure rib and a roller coupled to the closure rib. In some disclosed examples, the outboard flap is to be movable relative to a rear spar of an aircraft wing between a stowed position and a deployed position. In some disclosed examples, the roller is to be received by an opening of a catch of a deflection control rib of the aircraft wing when the outboard flap is in the stowed position. In some disclosed examples, the catch is to be coupled to and extend rearward from a primary arm of the deflection control rib. In some disclosed examples, the primary arm is to be coupled to and extend rearward from a rear spar fitting of the aircraft wing proximate a lower surface of the aircraft wing. In some disclosed examples, the rear spar fitting is to be coupled to the rear spar.

In some disclosed examples, the outboard flap further comprises a closure rib fitting coupled to the closure rib. In some disclosed examples, the closure rib fitting has a spigot extending away from the closure rib and a nut located within the spigot. In some disclosed examples, the outboard flap further comprises a roller arm positioned within and extending from the spigot. In some disclosed examples, the roller arm is coupled to the spigot via the nut. In some disclosed examples, the roller is mounted on the roller arm. In some disclosed examples, the roller is coupled to the closure rib via the roller arm, the nut, the spigot, and the closure rib fitting.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft wing, comprising:
a rear spar;
an outboard flap movable relative to the rear spar between a stowed position and a deployed position, the outboard flap including a leading edge, a trailing edge located rearward of the leading edge, an upper surface extending between the leading edge and the trailing edge, a lower surface located opposite the upper surface and extending between the leading edge and the trailing edge, a closure rib extending between the leading edge, the trailing edge, the upper surface, and the lower surface, and a roller coupled to the closure rib, the roller located between the leading edge, the trailing edge, the upper surface, and the lower surface of the outboard flap;
a rear spar fitting coupled to the rear spar; and
a deflection control rib including:
a primary arm coupled to and extending rearward from the rear spar fitting adjacent a lower surface of the aircraft wing; and
a catch coupled to and extending rearward from the primary arm, the catch including an opening to receive the roller of the outboard flap when the outboard flap is in the stowed position.

2. The aircraft wing of claim 1, wherein the rear spar fitting includes a first end and a second end located opposite the first end of the rear spar fitting, the primary arm of the deflection control rib includes a first end and a second end located opposite the first end of the primary arm, and the catch of the deflection control rib includes a first end and a second end located opposite the first end of the catch, and wherein the first end of the primary arm is coupled to the second end of the rear spar fitting, the first end of the catch is coupled to the second end of the primary arm, and the opening of the catch is located at the second end of the catch.

3. The aircraft wing of claim 2, further comprising a tie rod including a first end and a second end located opposite the first end of the tie rod, the first end of the tie rod coupled to the first end of the rear spar fitting, the second end of the tie rod coupled to the second end of the primary arm of the deflection control rib.

4. The aircraft wing of claim 3, wherein a length of the tie rod is adjustable to align a lower surface of the catch with the lower surface of the outboard flap when the outboard flap is in the stowed position.

5. The aircraft wing of claim 1, wherein the outboard flap further includes a closure rib fitting coupled to the closure rib at a location between the leading edge, the trailing edge, the upper surface, and the lower surface of the outboard flap, the closure rib fitting having a spigot extending away from the closure rib and further having a nut located within the spigot.

6. The aircraft wing of claim 5, wherein the outboard flap further includes a roller arm positioned within and extending from the spigot, the roller arm coupled to the spigot via the nut.

7. The aircraft wing of claim 6, wherein the roller is mounted on the roller arm, the roller coupled to the closure rib via the roller arm, the nut, the spigot, and the closure rib fitting.

8. The aircraft wing of claim 1, further comprising an inboard flap separated from the outboard flap by a gap, the inboard flap including a leading edge, a trailing edge located rearward of the leading edge of the inboard flap, an upper surface extending between the leading edge of the inboard flap and the trailing edge of the inboard flap, a lower surface located opposite the upper surface of the inboard flap and extending between the leading edge of the inboard flap and the trailing edge of the inboard flap, and a closure rib extending between the leading edge of the inboard flap, the trailing edge of the inboard flap, the upper surface of the inboard flap, and the lower surface of the inboard flap.

9. The aircraft wing of claim 8, wherein the deflection control rib extends into a portion of the gap existing between the leading edge of the outboard flap adjacent the lower surface of the outboard flap and the leading edge of the inboard flap adjacent a lower surface of the inboard flap when the outboard flap and the inboard flap are stowed.

10. The aircraft wing of claim 8, wherein the gap is partially sealed via a first sculpted bulb seal coupled to the leading edge of the outboard flap and via a second sculpted bulb seal coupled to the leading edge of the inboard flap.

11. The aircraft wing of claim 8, wherein a lower surface of the catch is positioned in a portion of the gap existing between the lower surface of the outboard flap and the lower surface of the inboard flap when the outboard flap and the inboard flap are stowed, and wherein the lower surface of the catch is approximately flush with the lower surface of the outboard flap and the lower surface of the inboard flap when the outboard flap and the inboard flap are stowed.

12. The aircraft wing of claim 8, wherein the leading edge of the outboard flap and the leading edge of the inboard flap do not have cutouts configured to accommodate the deflection control rib.

13. The aircraft wing of claim 1, further comprising an electrical wiring bundle extending in a spanwise direction of the aircraft wing, the electrical wiring bundle not passing through the deflection control rib.

14. A deflection control rib, comprising:
a primary arm coupled to and extend rearward from a rear spar fitting of an aircraft wing adjacent a lower surface of the aircraft wing, the rear spar fitting coupled to a rear spar of the aircraft wing; and
a catch coupled to and extending rearward from the primary arm, the catch including an opening to receive a roller of an outboard flap of the aircraft wing when the outboard flap is in a stowed position, the outboard flap movable relative to the rear spar between the stowed position and a deployed position, the outboard flap including a leading edge, a trailing edge located rearward of the leading edge, an upper surface extending between the leading edge and the trailing edge, a lower surface located opposite the upper surface and extending between the leading edge and the trailing edge, and a closure rib extending between the leading edge, the trailing edge, the upper surface, and the lower surface of the outboard flap, the roller coupled to the closure rib, the roller located between the leading edge, the trailing edge, the upper surface, and the lower surface of the outboard flap.

15. The deflection control rib of claim 14, wherein the rear spar fitting includes a first end and a second end located opposite the first end of the rear spar fitting, the primary arm of the deflection control rib includes a first end and a second end located opposite the first end of the primary arm, and the catch of the deflection control rib includes a first end and a second end located opposite the first end of the catch, and wherein the first end of the primary arm is coupled to the second end of the rear spar fitting, the first end of the catch is coupled to the second end of the primary arm, and the opening of the catch is located at the second end of the catch.

16. The deflection control rib of claim 15, wherein the second end of the primary arm of the deflection control rib is coupled to the first end of the rear spar fitting via a tie rod, the tie rod extending between the second end of the primary arm and the first end of the rear spar fitting.

17. An outboard flap, comprising:
a leading edge;
a trailing edge located rearward of the leading edge;
an upper surface extending between the leading edge and the trailing edge;
a lower surface located opposite the upper surface and extending between the leading edge and the trailing edge;
a closure rib extending between the leading edge, the trailing edge, the upper surface, and the lower surface of the outboard flap; and
a roller coupled to the closure rib, the roller located between the leading edge, the trailing edge, the upper surface, and the lower surface of the outboard flap;
wherein the outboard flap is movable relative to a rear spar of an aircraft wing between a stowed position and a deployed position, the roller is received by an opening of a catch of a deflection control rib of the aircraft wing when the outboard flap is in the stowed position, the catch is coupled to and extends rearward from a primary arm of the deflection control rib, the primary arm is coupled to and extends rearward from a rear spar fitting of the aircraft wing adjacent a lower surface of the aircraft wing, and the rear spar fitting is coupled to the rear spar.

18. The outboard flap of claim 17, further comprising a closure rib fitting coupled to the closure rib at a location between the leading edge, the trailing edge, the upper surface, and the lower surface of the outboard flap, the closure rib fitting having a spigot extending away from the closure rib and a nut located within the spigot.

19. The outboard flap of claim 18, further comprising a roller arm positioned within and extending from the spigot, the roller arm coupled to the spigot via the nut.

20. The outboard flap of claim 19, wherein the roller is mounted on the roller arm, the roller coupled to the closure rib via the roller arm, the nut, the spigot, and the closure rib fitting.

21. The aircraft wing of claim 3, further comprising a flap drive extending in a spanwise direction of the aircraft wing through a bounded area formed by the tie rod, the primary arm, and the rear spar fitting.

* * * * *

UNITED STATES PATENT AND TRADEMARK OFFICE
CERTIFICATE OF CORRECTION

Page 1 of 1

PATENT NO. : 10,882,601 B2
APPLICATION NO. : 15/783385
DATED : January 5, 2021
INVENTOR(S) : Ahern et al.

It is certified that error appears in the above-identified patent and that said Letters Patent is hereby corrected as shown below:

In the Claims

Column 16, Claim 14, Line 51, replace "extend" with --extending--

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*